United States Patent
Kim et al.

(10) Patent No.: US 10,560,896 B2
(45) Date of Patent: Feb. 11, 2020

(54) METHOD AND DEVICE FOR RECEIVING SIGNALS BY STATION IN WIRELESS COMMUNICATION SYSTEM

(71) Applicant: LG ELECTRONICS INC., Seoul (KR)

(72) Inventors: Jeongki Kim, Seoul (KR); Kiseon Ryu, Seoul (KR); Jinsoo Choi, Seoul (KR); Giwon Park, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 212 days.

(21) Appl. No.: 15/505,550

(22) PCT Filed: Aug. 20, 2015

(86) PCT No.: PCT/KR2015/008688
§ 371 (c)(1),
(2) Date: Feb. 21, 2017

(87) PCT Pub. No.: WO2016/039534
PCT Pub. Date: Mar. 17, 2016

(65) Prior Publication Data
US 2017/0289911 A1   Oct. 5, 2017

Related U.S. Application Data

(60) Provisional application No. 62/068,774, filed on Oct. 27, 2014, provisional application No. 62/067,378, (Continued)

(51) Int. Cl.
*H04W 52/02* (2009.01)
*H04W 84/12* (2009.01)
*H04W 72/04* (2009.01)

(52) U.S. Cl.
CPC ... *H04W 52/0235* (2013.01); *H04W 72/0446* (2013.01); *H04W 84/12* (2013.01); *Y02D 70/00* (2018.01)

(58) Field of Classification Search
CPC ....... Y02D 70/00; Y02D 70/22; H04W 88/08; H04W 52/0235; H04W 52/0209;
(Continued)

(56) References Cited

U.S. PATENT DOCUMENTS

2007/0147284 A1* 6/2007 Sammour ............. H04J 3/0605
370/328
2013/0301502 A1   11/2013 Kwon et al.
(Continued)

FOREIGN PATENT DOCUMENTS

CA          2863800         8/2013
WO        2013122424        8/2013
(Continued)

OTHER PUBLICATIONS

PCT International Application No. PCT/KR2015/008688, Written Opinion of the International Searching Authority dated Dec. 7, 2015, 17 pages.
(Continued)

*Primary Examiner* — Yemane Mesfin
*Assistant Examiner* — Mon Cheri S Davenport
(74) *Attorney, Agent, or Firm* — Lee, Hong, Degerman, Kang & Waimey

(57) ABSTRACT

The present specification relates to a method for transmitting signals by a station (STA) which operates in a wireless LAN system. Here, the method for transmitting signals by a station can comprise: a step of receiving a first frame for converting a power saving (PS) mode, from an access point (AP) station, to an awake mode; and a step of transmitting a second frame for informing the awake mode of the station in response to the first frame. Here, the second frame can be a null data packet (NDP) frame.

11 Claims, 27 Drawing Sheets

Related U.S. Application Data filed on Oct. 22, 2014, provisional application No. 62/040,432, filed on Aug. 22, 2014.

(58) Field of Classification Search
CPC .............. H04W 52/0219; G06F 1/3206; G06F 1/3234; G06F 1/3287
See application file for complete search history.

(56) References Cited

U.S. PATENT DOCUMENTS

| | | |
|---|---|---|
| 2014/0071873 A1 | 3/2014 | Wang et al. |
| 2014/0112226 A1* | 4/2014 | Jafarian ............ H04W 52/0229 370/311 |
| 2014/0126391 A1 | 5/2014 | Liu et al. |

FOREIGN PATENT DOCUMENTS

| | | |
|---|---|---|
| WO | 2014011006 | 1/2014 |
| WO | 2014042596 | 3/2014 |

OTHER PUBLICATIONS

European Patent Office Application Serial No. 15840705.6, Search Report dated May 2, 2018, 8 pages.

\* cited by examiner

FIG. 18

| | B0 B1 | B2 | B3 | B4 B9 | B10 B12 | B13 B15 | B16 B18 | B19 B21 | B22 | B23 |
|---|---|---|---|---|---|---|---|---|---|---|
| Composite Name: | | Reserved | STBC | Group ID | NSTS/Partial AID | | | | TXOP PS NOT ALLOWED | Reserved |
| SU Name: | BW | | | | SU NSTS | Partial AID | | | | |
| MU Name: | | | | | MU[0] NSTS | MU[1] NSTS | MU[2] NSTS | MU[3] NSTS | | |
| Bits: | 2 | 1 | 1 | 6 | 3 | 3 | 3 | 3 | 1 | 1 |

(a)

| | B0 | B1 | B2 | B3 | B4 | B5 | B6 | B7 | B8 | B9 | B10 B17 | B18 B23 |
|---|---|---|---|---|---|---|---|---|---|---|---|---|
| Composite Name: | Short GI | Short GI NSYM Disambiguation | SU/MU[0] Coding | LDPC Extra OFDM symbol | SU VHT-MCS/MU[1-3] Coding | | | | Beam-formed | Reserved | CRC | Tail |
| SU Name: | | | | | SU VHT-MCS | | | | Beam-formed | | | |
| MU Name: | | | | | MU[1] Coding | MU[2] Coding | MU[3] Coding | Reserved | Reserved | | | |
| Bits: | 1 | 1 | 1 | 1 | 1 | 1 | 1 | 1 | 1 | 1 | 8 | 6 |

(b)

FIG. 19
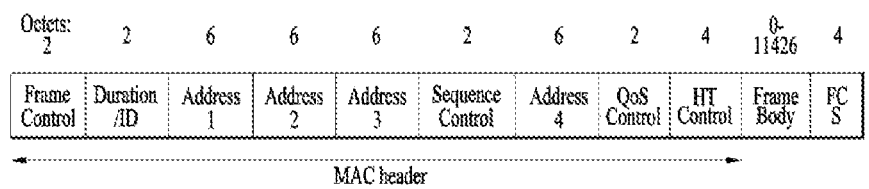
FIG. 20
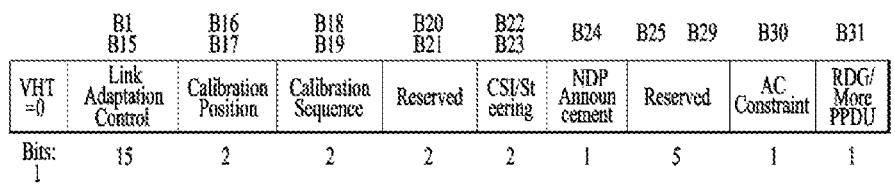
(a)
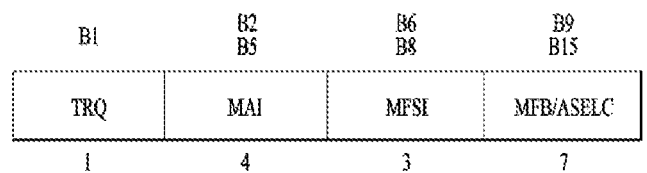
(b)

FIG. 21

| | B1 | B2 | B3 B5 | B6 B8 | B9 B23 | B24 B26 | B27 | B28 | B29 | B30 | B31 |
|---|---|---|---|---|---|---|---|---|---|---|---|
| | VHT=1 | Reserved | MRQ | MSI | MFSI/ GID-L | MFB | GID-H | Coding Type | FB Tx Type | Unsoli cited MFB | AC Constraint | RDG/ More PPDU |
| Bits: | 1 | 1 | 1 | 3 | 3 | 15 | 3 | 1 | 1 | 1 | 1 | 1 |

(a)

| B9 B11 | B12 B15 | B16 B17 | B16 B23 |
|---|---|---|---|
| VHT N_STS | MCS | BW | SNR |
| 3 | 4 | 2 | 6 |

| | Frame Control | A1 | A2 | Sequence Control | A3 | A4 | Frame Body | FCS |
|---|---|---|---|---|---|---|---|---|
| Octets: | 2 | 2 or 6 | 6 or 2 | 0 or 2 | 0 or 6 | 0 or 6 | variable | 4 |

(a)

| | B0 B1 | B2 B4 | B5 B7 | B8 | B9 | B10 | B11 | B12 | B13 | B14 | B15 |
|---|---|---|---|---|---|---|---|---|---|---|---|
| | Protocol Version | Type | PTID/ Subtype | From DS | More Fragm ents | Power Manage ents | More Data | Protected Frame | End of Service Period | Relayed Frame | Ack Policy |
| Bits: | 2 | 3 | 3 | 1 | 1 | 1 | 1 | 1 | 1 | 1 | 1 |

(b)

FIG. 26
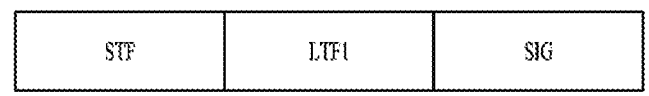
(a)
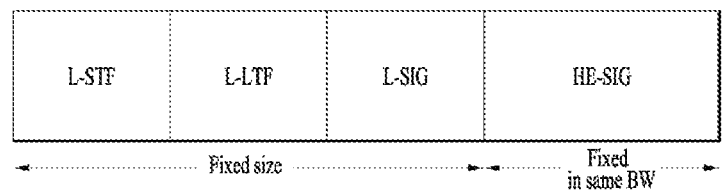
(b)

FIG. 29
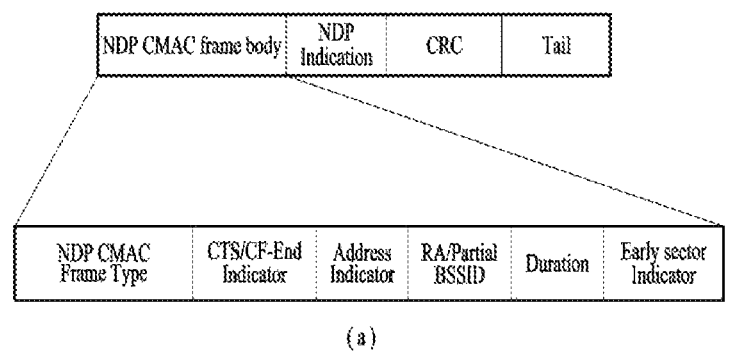
(a)
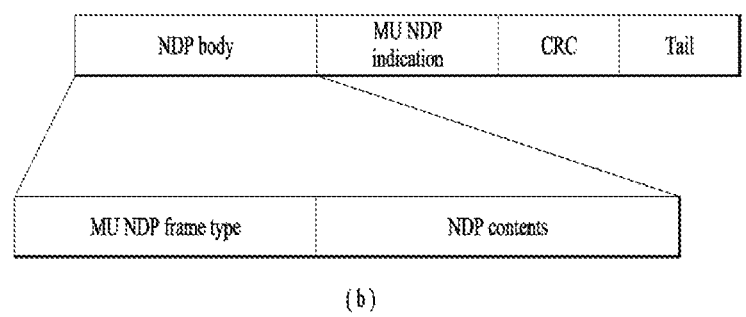
(b)

FIG. 30
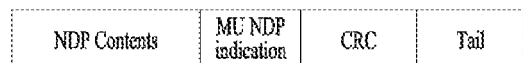
(a)
(b)
FIG. 31
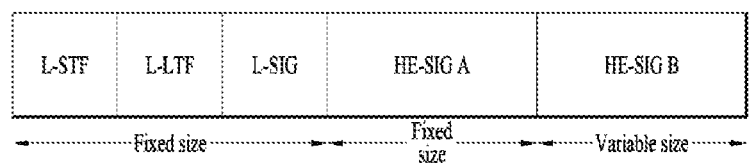

METHOD AND DEVICE FOR RECEIVING SIGNALS BY STATION IN WIRELESS COMMUNICATION SYSTEM

CROSS-REFERENCE TO RELATED APPLICATIONS

This application is the National Stage filing under 35 U.S.C. 371 of International Application No. PCT/KR2015/008688, filed on Aug. 20, 2015, which claims the benefit of U.S. Provisional Application Nos. 62/040,432, filed on Aug. 22, 2014, 62/067,378, filed on Oct. 22, 2014 and 62/068,774, filed on Oct. 27, 2014, the contents of which are all hereby incorporated by reference herein in their entirety.

TECHNICAL FIELD

The present disclosure relates to wireless communication systems, and more particularly, to a method and device for receiving a signal by a station in a wireless communication system.

BACKGROUND ART

While a signal transmission method proposed below is applicable to various types of wireless communication, a Wireless Local Area Network (WLAN) system will be described as an exemplary system to which the present disclosure is applicable.

WLAN Standards have been developed as Institute of Electrical and Electronics Engineers (IEEE) 802.11. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present disclosure devised to solve the problem lies in a method and device for transmitting a signal by an STA in a wireless communication system.

It is another object of the present disclosure to provide a method for improving the efficiency of use of radio resources by configuring a frame transmitted by an STA as an NDP (Null Data Packet) frame in a wireless communication system to reduce unnecessary information to prevent waste of resources.

Technical Solution

To achieve these objects and other advantages and in accordance with the purpose of the invention, a method of transmitting a signal by a station (STA) operating in a wireless LAN system, the method comprising: receiving, from an access point (AP) STA, a first frame for switching a power saving (PS) mode to an awake mode; and transmitting, to the AP STA, a second frame indicating the awake mode of the STA in response to the first frame, wherein the second frame is a Null Data Packet (NDP) frame.

To achieve these objects and other advantages and in accordance with the purpose of the invention, a station (STA) for transmitting a signal in a wireless communication system, comprising: a transceiver module configured to exchange data with an external device and a processor configured to control the transceiver module, wherein the processor is configured to: receive, from an access point (AP) STA, a first frame for switching a power saving (PS) mode to an awake mode using the transceiver module; and transmit, to the AP STA, a second frame indicating the awake mode of the STA in response to the first frame, using the transceiver module, wherein the second frame is a Null Data Packet (NDP) frame.

The following description may be commonly applied to the embodiments of the present invention.

To achieve these objects and other advantages and in accordance with the purpose of the invention, the first frame is one of a trigger frame, a polling frame, and a downlink (DL) data frame.

To achieve these objects and other advantages and in accordance with the purpose of the invention, the second frame comprises a first part and a second part.

To achieve these objects and other advantages and in accordance with the purpose of the invention, the first part is a legacy part, and the second part is a HE (High Efficiency) part, wherein only a HE-SIG field among the HE-SIG field, a HE-STF field, a HE-LTF field and a DATA field is included in the second part when the second frame is the NDP frame.

To achieve these objects and other advantages and in accordance with the purpose of the invention, the first part has a fixed symbol size regardless of a size of an allocated resource and the second part has a variable symbol size based on the size of the allocated resource.

To achieve these objects and other advantages and in accordance with the purpose of the invention, the number of information bits included in the second part is fixed regardless of a bandwidth, and the variable symbol size is set based on the number of information bits.

To achieve these objects and other advantages and in accordance with the purpose of the invention, the second part comprises at least one of an NDP body field, an MU ND indication field, a CRC field, and a Tail field. The NDP body field comprises at least one of a type field and a content field, wherein information contained in the content field is configured based on the type field.

To achieve these objects and other advantages and in accordance with the purpose of the invention, the type field is not included in the NDP body field when the type field is received in the first frame.

To achieve these objects and other advantages and in accordance with the purpose of the invention, the first part has a fixed symbol size regardless of a size of an allocated resource, and the second part comprises a fixed size part having a fixed symbol size regardless of the size of the allocated resource and a variable size part based on the size of the allocated resource. The fixed size part contains common information, and the variable size part contains information on a specific STA.

To achieve these objects and other advantages and in accordance with the purpose of the invention, the fixed size part is an HE-SIG A field and the variable size part is an HE-SIG B field.

To achieve these objects and other advantages and in accordance with the purpose of the invention, the variable size part further comprises at least one of the HE-STF field and the HE-LTF field when the second part comprises the fixed size part and the variable size part.

Advantageous Effects

According to the present disclosure, a method and apparatus for transmitting a signal by a station in a wireless communication system may be provided.

According to the present disclosure, there may be provided a method for improving efficiency of use of radio resources by preventing waste of resources by reducing unnecessary information by configuring a frame transmitted by a station as an NDP (Null Data Packet) frame in a wireless communication system.

The effects that may be obtained by the present invention are not limited to the above-mentioned effects, and other effects not mentioned herein may be clearly understood from the following description by those skilled in the art to which the present invention pertains.

DESCRIPTION OF DRAWINGS

FIGS. 14 to 18 are diagrams illustrating an example of a frame structure used in the IEEE 802.11 system.

FIGS. 19 to 21 are diagrams illustrating a MAC frame format.

FIG. 22 is a diagram illustrating a Short MAC frame format.

FIG. 26 is a diagram illustrating a structure of an NDP frame transmitted by a plurality of STAs.

FIGS. 29 and 30 are diagrams illustrating an NDP frame format included in a HE-SIG field.

FIGS. 31 and 32 illustrate a HE-SIG part consisting of a fixed size part and a variable size part.

BEST MODE

Figure 1:
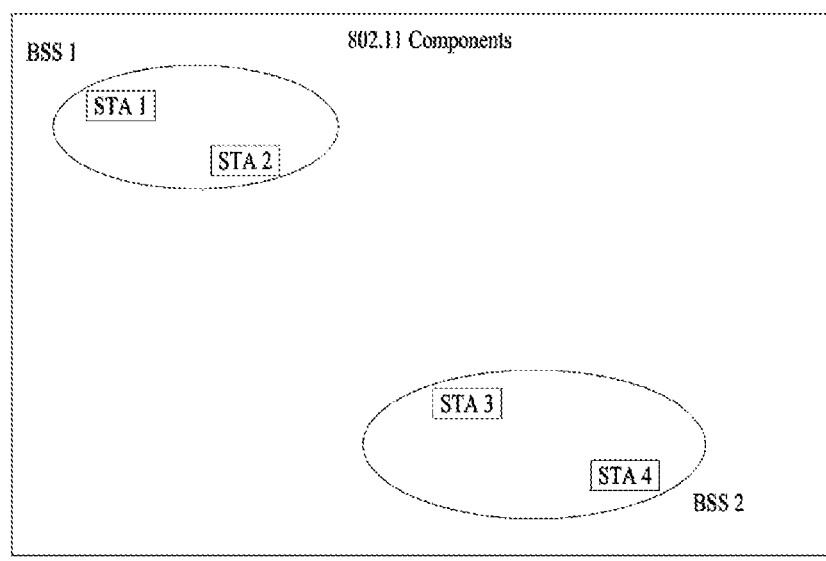
FIG. 1 is a diagram illustrating an example of configuration of a WLAN system.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

In the present disclosure, a terminology, each of which includes such an ordinal number as 1st, 2nd and the like, may be used to describe various components. In doing so, the various components should be non-limited by the corresponding terminologies, respectively. The terminologies are only used for the purpose of discriminating one component from other components. For example, a first configuration element can be referred to as a second configuration element, similarly, the second configuration element can be referred to as the first configuration element while not being deviated from the scope of right according to the concept of the present specification.

In the present application, such a terminology as 'comprise', 'include' and the like should be construed not as excluding existence of a different configuration element but as designating further existence of a different configuration element. In this disclosure, such a terminology as ' . . . unit', ' . . . part' corresponds to a unit for processing at least one or more functions or operations. The unit can be implemented by a combination of hardware and/or software.

FIG. 1 is a view illustrating an exemplary configuration of a Wireless Local Area Network (WLAN) system.

As depicted in FIG. 1, a wireless local area network includes at least one Basic Service Set (BSS). The BSS is a set of Stations (STA) capable of communicating with each other by successfully performing synchronization.

The STA is a logical entity including a physical layer interface for a Medium Access Control (MAC) and wireless media. The STA includes an Access Point (AP) and a Non-AP STA. A mobile terminal operated by a user corresponds to the Non-AP STA among the STAs. If it is simply called an STA, the STA may correspond to the Non-AP STA. The Non-AP STA can be called such a different name as a terminal, a Wireless Transmit/Receive Unit (WTRU), User Equipment (UE), a Mobile Station (MS), a Mobile Terminal, a Mobile Subscriber Unit, or the like.

And, the AP is an entity providing an STA associated to the AP with an access to a Distribution System (DS) via the wireless media. The AP can be called a concentrated controller, a Base Station (BS), a Node-B, a Base Transceiver System (BTS), a site controller, or the like.

The BSS can be divided into an infrastructure BSS and an Independent BSS (IBS S).

The BSS depicted in FIG. 1 corresponds to the IBSS. The IBSS means the BSS not including an AP. Since the IBSS does not include the AP, an access to the DS is not permitted to the IBSS. Thus, the IBSS forms a self-contained network.

Figure 2:
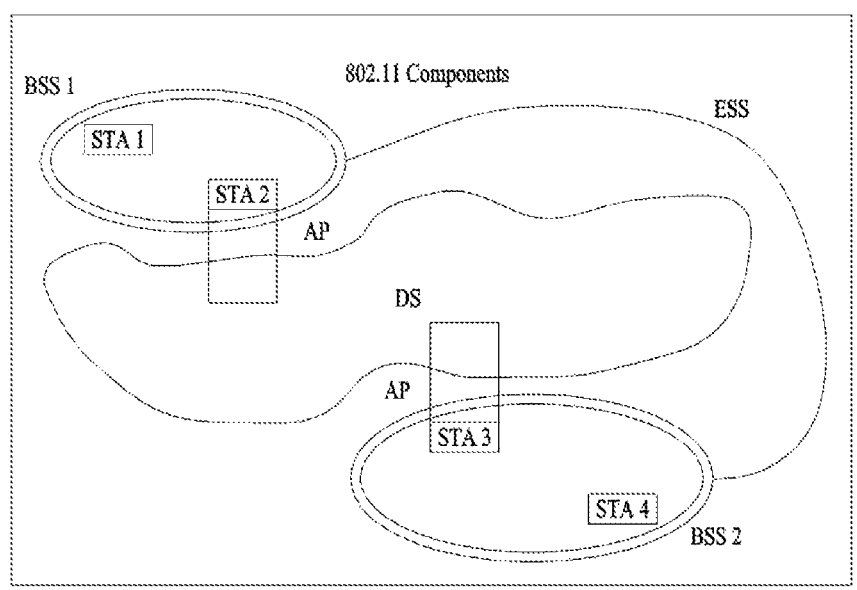
FIG. 2 is a diagram illustrating another example of configuration of a WLAN system.

FIG. 2 is a view illustrating another exemplary configuration of a WLAN system.

The BSS depicted in FIG. 2 corresponds to the infrastructure BSS. The infrastructure BSS includes at least one STA and an AP. Although a principle of a communication between non-AP STAs is to perform the communication via the AP, if a link is directly established between the non-AP STAs, it is possible to directly communicate between the non-AP STAs.

As depicted in FIG. 2, a plurality of infrastructure BSSs can be connected to each other via the DS. A plurality of the infrastructure BSSs connected through the DS is called an Extended Service Set (ESS). STAs included in the ESS can communicate with each other and a non-AP STA can move from one BSS to another BSS while seamlessly communicating in an identical ESS.

The DS is a mechanism connecting a plurality of APs to each other and the DS is not necessarily to be a network. If the DS is able to provide a prescribed distribution service, there is no limit on a form of the DS. For instance, the DS may correspond to such a wireless network as a mesh network or may correspond to a physical structure connecting APs to each other.

Figure 3:
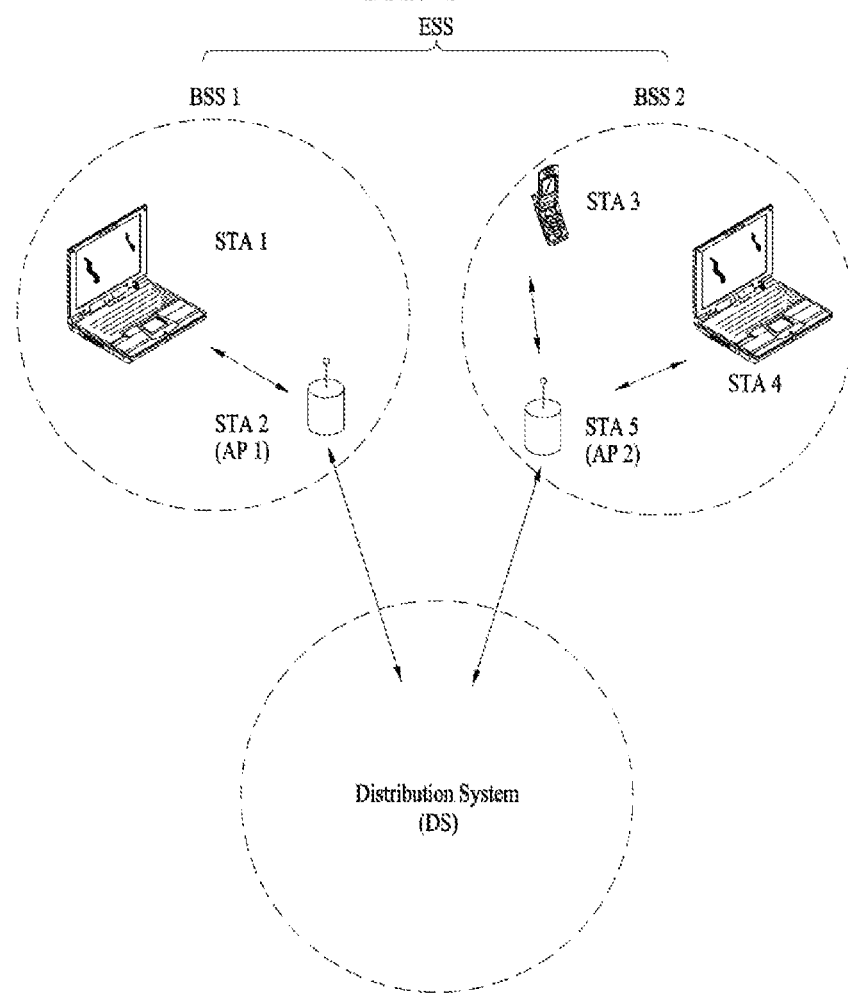
FIG. 3 is a diagram illustrating an exemplary structure of a WLAN system.

FIG. 3 is a view illustrating an exemplary structure of a WLAN system. In FIG. 3, an example of an infrastructure BSS including a DS is described.

Referring to an example of FIG. 3, ESS includes a BSS1 and BSS2. In a WLAN system, a station corresponds to a device operating according to MAC/PHY regulation of IEEE 802.11. A station includes an AP station and a non-AP station. In general, the non-AP station corresponds to such a device directly handled by a user as a laptop computer, a mobile phone, and the like. In the example of FIG. 3, a station 1, a station 3, and a station 4 correspond to the non-AP station and a station 2 and a station 5 correspond to the AP station.

In the following description, the non-AP station may be referred to as a terminal, a Wireless Transmit/Receive Unit (WTRU), a User Equipment (UE), a Mobile Station (MS), a mobile terminal, a Mobile Subscriber Station (MSS), and the like. And, the AP corresponds to a Base Station (BS), a Node-B, an evolved Node-B (eNB), a Base Transceiver System (BTS), a femto BS, and the like.

Figure 4:
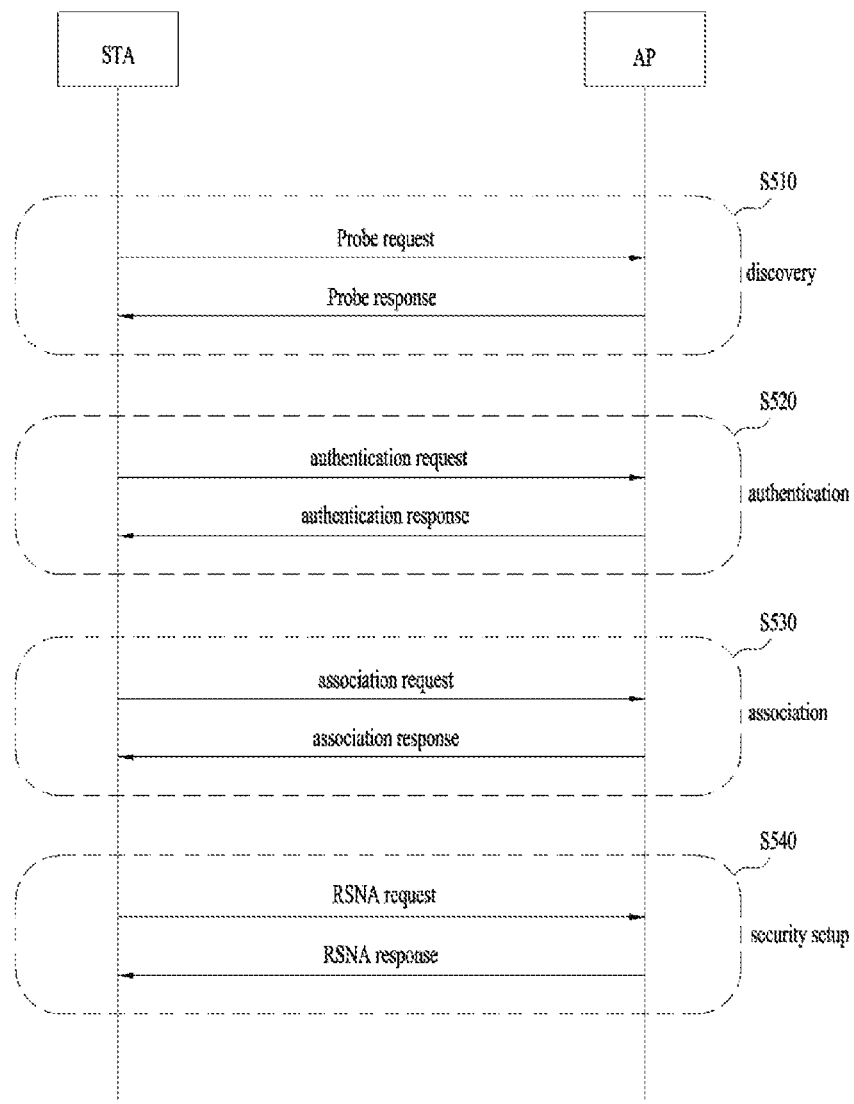
FIG. 4 is a diagram illustrating a link setup procedure in a WLAN system.
Figure 5:
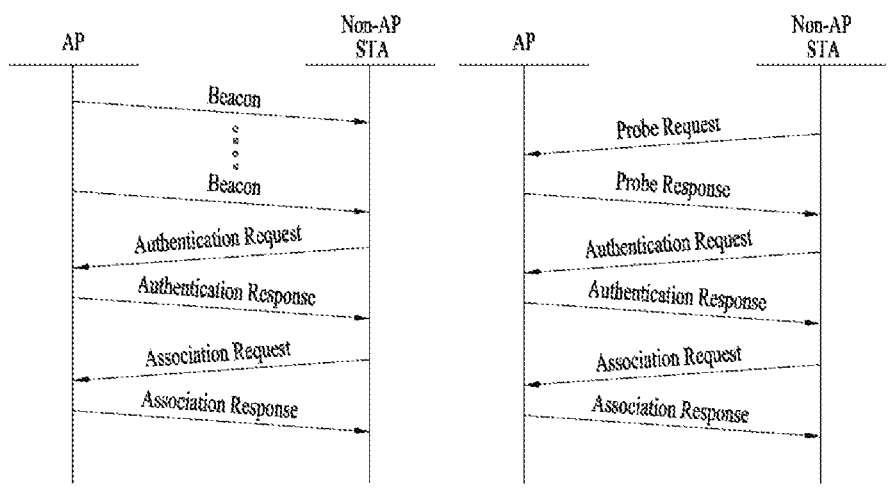
FIG. 5 illustrates an active scanning method and a passive scanning method.

FIG. 4 is a flowchart illustrating a link setup procedure in a WLAN system, and FIG. 5 is a view illustrating an active scanning method and a passive scanning method.

In order for an STA to set up a link with a network and transceive data with the network, it is necessary for the station to discover the network, perform authentication, establish association, and pass through an authentication procedure for security. The link setup procedure can also be referred to as a session initiation procedure or a session setup procedure. And, discovery, authentication, association, and security setup procedures of the link setup procedure can be commonly called an association procedure.

An example of the link setup procedure is explained in the following with reference to FIG. 4.

In the step S410, an STA can perform a network discovery operation. The network discovery operation can include a scanning operation of the STA. In particular, in order for the STA to access a network, it is necessary for the STA to find out a network in which the STA is able to participate. The STA needs to identify a compatible network before participating in a wireless network. A procedure of identifying a network existing at a specific region is called scanning.

A scanning scheme includes active scanning and passive scanning. In FIG. 4, although a network discovery operation including an active scanning procedure is explained for example, an STA may operate with a passive scanning procedure.

According to the active scanning, a scanning performing STA transmits a probe request frame to a responder to discover an AP existing in the vicinity of the STA and waits for a response. The responder transmits a probe response frame to the STA, which has transmitted the probe request frame, in response to the probe request frame. In this case, the responder may correspond to an STA, which has lastly transmitted a beacon frame in a BSS on a channel being scanned. In the BSS, since an AP transmits a beacon frame, the AP becomes the responder. In an IBSS, since STAs in the IBSS alternately transmit a beacon, the responder is not fixed. For example, if an STA transmits a probe request frame on a channel 1 and receives a probe response frame on the channel 1, the STA stores BSS-related information included in the received probe response frame, moves to a next channel (e.g., a channel 2), and may be able to perform scanning (i.e., transmit and receive a probe request/response on the channel 2) using an identical method.

Referring to FIG. 5, scanning can also be performed by a passive scanning scheme. According to the passive scanning, a scanning performing STA waits for a beacon frame while switching a channel. A beacon frame is one of management frames in IEEE 802.11. The beacon frame is periodically transmitted to notify the existence of a wireless network and make the scanning performing STA discover and participate in the wireless network. In a BSS, an AP plays a role in periodically transmitting a beacon frame. In an IBSS, STAs belonging to the IBSS alternately transmit a beacon frame. Having received a beacon frame, the scanning performing STA stores information on the BSS included in the beacon frame and records beacon frame information on each channel while switching to a different channel. Having received a beacon frame, an STA stores BSS-related information included in the received beacon frame, moves to a next channel, and may be able to perform scanning on the next channel using an identical method.

When the active scanning and the passive scanning are compared, the active scanning has a merit in that delay is less and power consumption is lower compared to the passive scanning.

After the network is discovered by the STA, an authentication procedure can be performed in the step S420. In order to clearly distinguish the authentication procedure from a security setup operation of the step S440, the authentication procedure can be referred to as a first authentication procedure.

According to the authentication procedure, the STA transmits an authentication request frame to the AP and the AP transmits an authentication response frame to the STA in response to the authentication request frame. An authentication frame used in the authentication request/response corresponds to a management frame.

The authentication frame include information on an authentication algorithm number, an authentication transaction sequence number, a status code, a challenge text, a Robust Security Network (RSN), a finite cyclic group, and the like. The above-mentioned information is just an example of information capable of being included in the authentication request/response. The information can be replaced with different information or may further include additional information.

The STA can transmit the authentication request frame to the AP. The AP can determine whether to grant authentication on the STA based on the information included in the received authentication request frame. The AP can transmit a result of the authentication procedure to the STA via the authentication response frame.

If the STA is successfully authenticated, an association procedure can be performed in the step S430. According to the association procedure, the STA transmits an association request frame to the AP and the AP transmits an association response frame to the STA in response to the association request frame.

For example, the association request frame can include such information as information related to various capabilities, a beacon listening interval, an SSID (service set identifier), supported rates, supported channels, an RSN, a mobility domain, supported operating classes, a TIM (traffic indication map broadcast request), interworking service capability, and the like.

For example, the association response frame can include such information as information related to various capabilities, a status code, an Association ID (AID), supported rates, an Enhanced Distributed Channel Access (EDCA), a parameter set, a Received Channel Power Indicator (RCPI), a Received Signal to Noise Indicator (RSNI), a mobility domain, a timeout interval (association comeback time), an overlapped BSS scan parameter, TIM broadcasting response, QoS map, and the like.

The above-mentioned information is just an example of information capable of being included in the association request/response frame. The information can be replaced with different information or may further include additional information.

If the STA is successfully associated with the network, the security setup procedure can be performed in the step S540. The security setup procedure of the step S440 can also be referred to as an authentication procedure via an RSNA (robust security network association) request/response. The authentication procedure of the step S520 can be referred to as a first authentication procedure and the security setup procedure of the step S540 can be simply referred to as an authentication procedure.

For example, the security setup procedure of the step S440 may include a private key setup procedure via 4-way handshaking through an Extensible Authentication Protocol over LAN (EAPOL) frame. And, the security setup procedure can also be performed according to a security scheme not defined in IEEE 802.11 standard.

Based on the aforementioned discussion, a collision detection technique in a WLAN system is explained in the following.

As mentioned in the foregoing description, since various elements influence on a channel in wireless environment, a transmitting end is unable to precisely detect a collision. Hence, 802.11 has introduced a Distributed Coordination Function (DCF) corresponding to a Carrier Sense Multiple Access/Collision Avoidance (CSMA/CA) mechanism.

Figure 6:
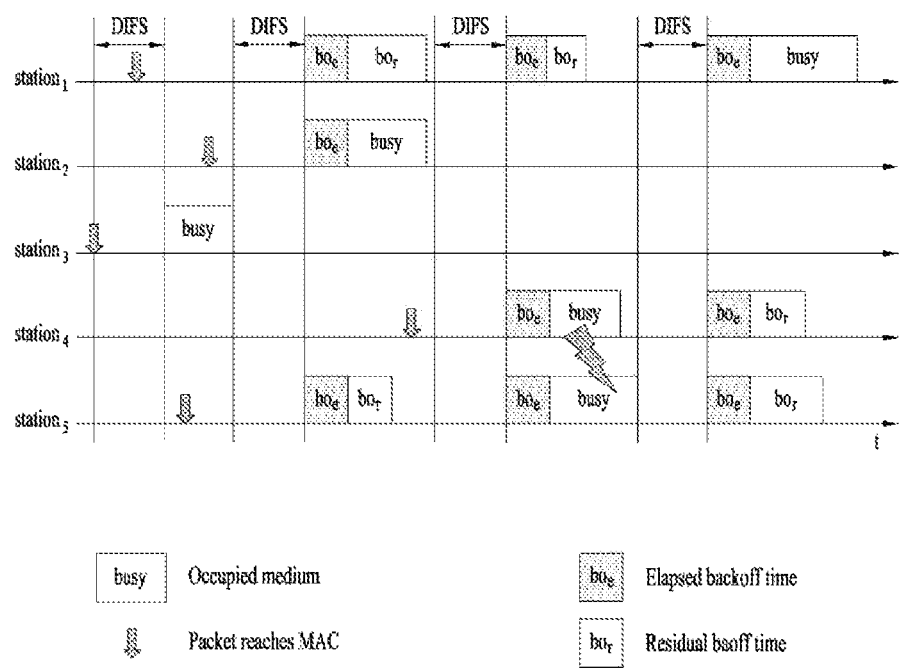
FIG. 6 is a diagram illustrating a DCF mechanism in a WLAN system.

FIG. 6 is a view illustrating a DCF mechanism in a WLAN system.

A DCF performs Clear Channel Assessment (CCA) that senses a medium during a specific period (e.g., DIFS: DCF inter-frame space) before data is transmitted by STAs including data to be transmitted. In this case, if a medium is idle (available), an STA can transmit a signal using the medium. However, if a medium is busy (unavailable), an STA can transmit data after waiting for a period as much as a random backoff period in addition to a DIFS under an assumption that many STAs are waiting for the use of the medium. In this case, the random backoff period plays a role in avoiding a collision. If it is assumed that there are many STAs to transmit data, each of the STAs has a statistically different backoff interval value. Consequently, each of the STAs has different transmission timing. If an STA starts to transmit data using the medium, other STAs are unable to use the medium.

A random backoff time and a procedure are briefly explained in the following.

If a state of a specific medium is switched to idle from busy, a plurality of STAs start to prepare for data transmission. In this case, in order to minimize collision, each of a plurality of the STAs intending to transmit data selects a random backoff count and waits for slot time as much as the random backoff count. The random backoff count is a pseudo-random integer value and the value is selected from among values uniformly distributed in a range of [0 CW]. In this case, the CW stands for 'contention window'.

A CW parameter selects a CWmin value as an initial value. If transmission fails, the CWmin value becomes twice the initial value. For example, if it fails to receive an ACK response in response to a transmitted data frame, it may consider it as a collision. If a CW value has a CWmax value, the CWmax value is maintained until data transmission is succeeded. The CW value is reset to the CWmin value when the data transmission is succeeded. In this case, in order to conveniently implement and operate the CW, the CWmin, and the CWmax, it is preferable to configure the CW, the CWmin, and the CWmax to be maintained by 2n−1.

Meanwhile, if a random backoff procedure starts, an STA selects a random backoff count from among a range of [0 CW] and continuously monitors a medium while a backoff slot is countdown. If the medium is switched to a busy state, the STA temporarily stops countdown. If the medium is switched back to the idle, the STA resumes countdown of the backoff slot.

Referring to FIG. 6, many STAs intend to transmit data. In case of an STA 3, since a medium was idle as much as a DIFS, the STA 3 immediately transmits a data frame and the rest of STAs wait until the medium becomes idle. Since the medium was busy for a while, a plurality of STAs are waiting for a chance of using the medium. Hence, each of a plurality of the STAs selects a random backoff count. In this case, FIG. 6 shows a case that an STA 2, which has selected a smallest backoff count, transmits a data frame.

After the transmission of the STA 2 is finished, the medium becomes idle again and the STAs resume countdown for the temporarily stopped backoff interval. Referring to FIG. 6, although an STA 5, which has a next smallest random backoff count value and temporarily stopped countdown when the medium is busy, count downs the remaining backoff slot and transmits a data frame, it is overlapped with a random backoff count value of an STA 4 by chance. It is able to see that a collision occurs. In this case, since both the STA 5 and the STA 4 are unable to receive an ACK response in response to a transmitted data, the STAs select a random backoff count value again after CW is increased as much as twice.

As mentioned in the foregoing description, the most fundamental principle of the CSMA/CA is carrier sensing. A terminal is able to use physical carrier sensing and virtual carrier sensing to determine whether or not a DCF medium is busy/idle. The physical carrier sensing is performed at a PHY (physical layer) and the physical carrier sensing is performed through energy detection or preamble detection. For example, if it is determined as a receiving end has measured a power level or has read a preamble, it can be considered as a medium is busy. The virtual carrier sensing is performed by setting a Network Allocation Vector (NAV) to make other STAs not transmit data. The virtual carrier sensing is performed through a duration field value of a MAC header. Meanwhile, in order to reduce possibility of collision, a robust collision detection mechanism has been introduced. The reason for the introduction of the robust collision detection mechanism can be checked by two examples described in the following. For clarity, assume that a carrier sensing range is identical to a transmission range.

Figure 7:
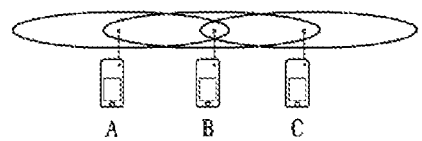
FIGS. 7 and 8 are exemplary diagrams illustrating the issue of the existing conflict resolution mechanism.
Figure 8:
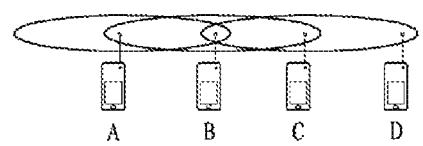

FIGS. 7 and 8 are view illustrating exemplary problems of a conventional collision resolution mechanism.

Specifically, FIG. 7 is a view illustrating hidden node issues. The present example shows a case that an STA A is communicating with an STA B and an STA C has information to be transmitted. Specifically, when the STA A transmits information to the STA B, since the STA C is out of transmission range of the STA A at the time of performing carrier sensing on a medium before transmitting data to the STA B, the STA C is unable to detect a signal transmitted by the STA A and there is a possibility that the medium is considered as being in an idle state. As a result, since the STA B receives information of the STA A and information of the STA C at the same time, a collision occurs. In this case, the STA A can be regarded as a hidden node of the STA C.

Meanwhile, FIG. 8 is a view illustrating exposed node issues. Currently, the STA B transmits data to the STA A. In this case, when the STA C performs carrier sensing, since the STA B is in a state of transmitting information, the carrier sensing shows a result that a medium is busy. As a result, although the STA C wants to transmit data to an STA D, since the media is sensed as busy, the STA C may unnecessarily wait until the medium becomes idle. In particular, although the STA A is located at the outside of a CS range of the STA C, the STA A may block information transmission of the STA C. In this case, the STA C becomes an exposed node of the STA B.

In order to make good use of a collision avoidance mechanism in the aforementioned situation, it may be able to introduce such a short signaling packet as RTS (request to send), CTS (clear to send), and the like. In particular, it may be able to use the short signaling packet to enable surrounding STAs to overhear whether or not two STAs transmit information. In particular, if an STA intending to transmit data transmits an RTS frame to an STA receiving the data, the receiving end STA can inform surrounding terminals that the receiving end STA is going to receive data by transmitting a CTS frame to the surrounding terminals.

Figure 9:
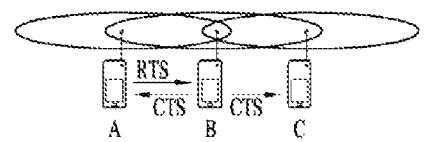
FIG. 9 is a diagram illustrating a mechanism for solving a hidden node problem using an RTS/CTS frame.

FIG. 9 is a diagram for explaining a mechanism of solving a hidden node issue using an RTS/CTS frame.

Referring to FIG. 9, both the STA A and the STA C intend to transmit data to the STA B. If the STA A sends RTS to the STA B, the STA B sends CTS to both the STA A and the STA C located near the STA B. As a result, the STA C waits until data transmission between the STA A and the STA B is finished. By doing so, it is able to avoid a collision.

Figure 10:
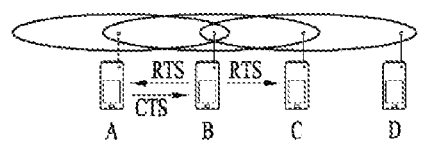
FIG. 10 is a diagram illustrating a mechanism for solving an exposed node problem using an RTS/CTS frame.

FIG. 10 is a view illustrating a mechanism of solving an exposed node issue using an RTS/CTS frame.

Referring to FIG. 10, the STA C overhears RTS/CTS transmission between the STA A and the STA B. By doing so, although the STA C transmits data to a different STA D, the STA C is able to know that a collision does not occur. In particular, the STA B transmits RTS to all terminals located near the STA B and transmits CTS to the STA A only to which data is to be practically transmitted. Since the STA C receives the RTS and does not receive the CTS of the STA A, the STA C is able to know that the STA A is located at the outside of a CS range of the STA C.

Figure 11:
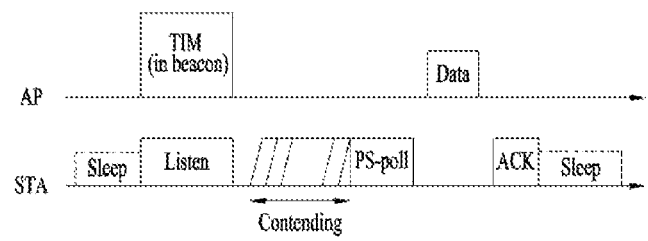
FIGS. 11 to 13 are diagrams illustrating operation of an STA receiving a TIM in detail.
Figure 12:
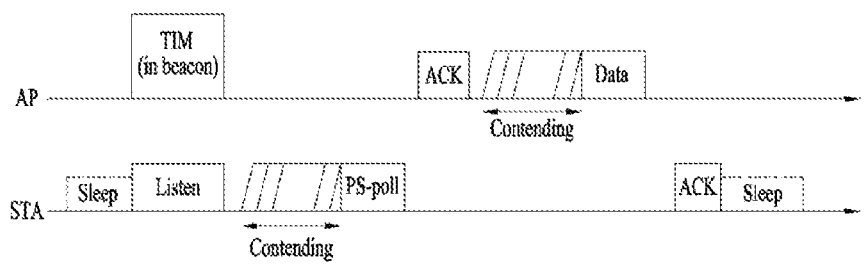
Figure 13:
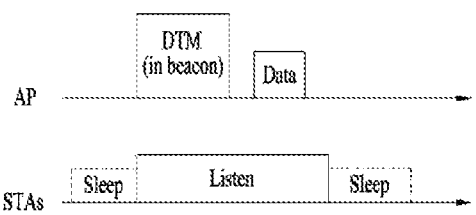
Figure 14:
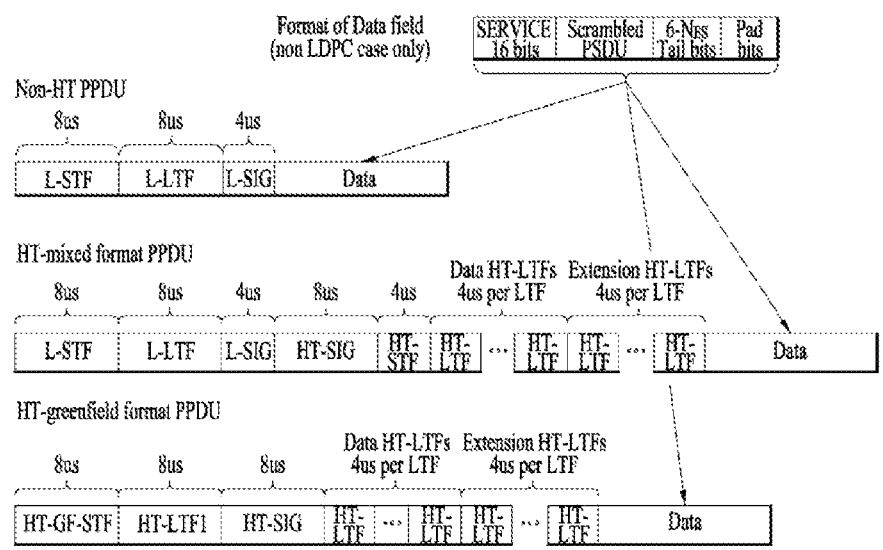

FIGS. 11 to 13 are views illustrating an operation of an STA which has received TIM.

Referring to FIG. 11, an STA switches to an awake state from a sleep state to receive a beacon frame including a TIM from an AP and interprets the received TIM element. By doing so, the STA is able to know there is a buffered traffic to be transmitted to the STA. The STA performs contending with other STAs to access a medium for transmitting a PS-poll frame and may be then able to transmit the PS-poll frame to request data frame transmission to the AP. Having received the PS-poll frame transmitted by the STA, the AP can transmit a frame to the STA. The STA receives a data frame and may be able to transmit a confirmation response (ACK) to the AP in response to the data frame. Subsequently, the STA can switch back to the sleep state.

As shown in FIG. 11, having received the PS-poll frame from the STA, the AP may operate according to an immediate response scheme that a data frame is transmitted after prescribed time (e.g., SIFS (short-inter-frame space)).

Meanwhile, after the AP receives the PS-poll frame, if the AP fails to prepare a data frame to be transmitted to the STA during SIFS time, the AP may operate according to a deferred response scheme. Regarding this, it is explained in the following with reference to FIG. 12.

In the example shown in FIG. 12, similar to the example of FIG. 11, the STA switches to the awake state from the sleep state, receives a TIM from the AP, performs contending with other STAs, and transmits the PS-poll frame to the AP. If the AP fails to prepare a data frame during an SIFS after the PS-poll frame is received, the AP can transmit an ACK frame instead of the data frame to the STA. If the data frame is ready after the ACK frame is transmitted, the AP can transmit the data frame to the STA after contending is performed. The STA transmits an ACK frame to the AP to indicate that the data frame is successfully received and can switch back to the sleep state.

FIG. 13 illustrates an example in which the AP transmits a DTIM. Stations can switch to the awake state from the sleep state to receive a beacon frame including a DTIM element from the AP. Having received the DTIM, the STAs are able to know that a multicast/broadcast frame is to be transmitted. After the beacon frame including the DTIM is transmitted, the AP can immediately transmit data (i.e., the multicast/broadcast frame) without an operation of transmitting and receiving a PS-poll frame. Having received the beacon frame including the DTIM, the STAs receive data while continuously maintaining the awake state and may be able to switch back to the sleep state after the data reception is completed.

FIGS. 14 to 18 are views illustrating exemplary frame structures used in an IEEE 802.11 system.

An STA can receive a Physical Layer Convergence Protocol (PLCP) Packet Data Unit (PPDU). In this case, a PPDU frame format can be configured in a manner of including a Short Training Field (STF), a Long Training Field (LTF), a SIGnal (SIG) field, and a data field. In this case, as an example, the PPDU frame format can be configured based on a type of the PPDU frame format.

As an example, a non-High Throughput (non-HT) PPDU frame format can be configured by a Legacy-STF (L-STF) field, a Legacy-LTF (L-LTF) field, an SIG field, and a data field only.

And, the type of the PPDU frame format can be configured by either a HT-mixed format PPDU or a HT-greenfield format PPDU. In this case, the aforementioned PPDU format can further include an additional (a different type of) STF, LTF, and an SIG field between the SIG field and the data field.

Figure 15:
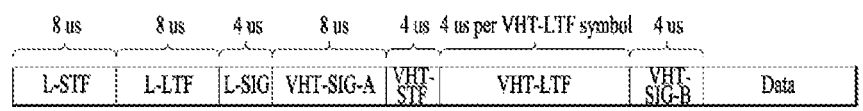

Referring to FIG. 15, it may be able to configure a Very High Throughput (VHT) PPDU format. In this case, the VHT PPDU format can also further include an additional (a different type of) STF, LTF, and an SIG field between the SIG field and the data field. More specifically, the VHT PPDU format can include at least one of a VHT-SIG-A field, a VHT-STF field, a VHT-LTF field, and a VHT-SIG-B field between the L-SIG field and the data field.

In this case, the STF may correspond to a signal for signal detection, Automatic Gain Control (AGC), diversity selection, minute time synchronization, and the like. And, the LTF may correspond to a signal for channel estimation, frequency error estimation, and the like. In this case, both the STF and the LTF can be referred to as a PCLP preamble. The PCLP preamble may correspond to a signal for OFDM physical layer synchronization and channel estimation.

Figure 16:

Referring to FIG. 16, the SIG field can include a RATE field, a LENGTH field, and the like. The RATE field can include information on modulation and a coding rate of a data. The LENGTH field can include information on a data length. In addition, the SIG field can include a parity bit, an SIG TAIL bit, and the like.

The data field can include a SERVIVE field, a PSDU (PLCP service data unit), a PPDU TAIL bit. If necessary, the data field can further include a padding bit.

Figure 17:
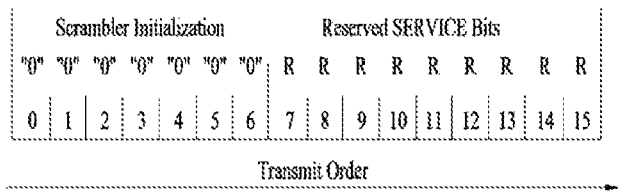

In this case, referring to FIG. 17, a partial bit of the SERVICE field can be used for synchronization of a descrambler in a receiving end and a partial bit can be configured by a reserved bit. The PSDU corresponds to a MAC Protocol Data Unit (PDU) defined in a MAC layer and can include data generated/used in a higher layer. The PPDU TAIL bit can be used for returning an encoder to a zero state. The padding bit can be used for matching a length of a data field with a prescribed unit.

And, as mentioned in the foregoing description, the VHT PPDU format can include an additional (or a different type of) STF, LTF, and an SIG field. In this case, L-STF, L-LTF, and L-SIG may correspond to a part of non-VHT in the VHT PPDU. In this case, VHT-SIG A, VHT-STF, VHT-LTF, and VHT-SIG may correspond to a part of VHT in the VHT PPDU. In particular, a field for the non-VHT and a region for the VHT field can be respectively defined in the VHT PPDU. In this case, as an example, the VHT-SIG A can include information for interpreting the VHT PPDU.

In this case, as an example, referring to FIG. 18, the VHT-SIG A can be configured by VHT SIG-A1 (FIG. 18(a)) and VHT SIG-A2 (FIG. 18(b)). In this case, each of the VHT SIG-A1 and the VHT SIG-A2 can be configured by 24 data bits and the VHT SIG-A1 can be transmitted prior to the VHT SIG-A2. In this case, the VHT SIG-A1 can include a BW field, an STBC field, a group ID field, an NSTS/partial AID field, a TXOP_PS_NOT_ALLOWED field, and a reserved field. And, the VHT SIG-A2 can include a short GI field, a short GI NSYM disambiguation field, an SU/MU[0] coding field, an LDPC extra OFDM symbol field, an SU VHT-MCS/MU[1-3] coding field, a beamformed field, a CRC field, a tail field, and a reserved field. Through the aforementioned fields, it may be able to check information on the VHT PPDU.

FIGS. 19, 20, and 21 are views illustrating a MAC frame format.

An STA may receive a PPDU in one of the above-described PPDU formats. A PSDU in a data part of the PPDU frame format may include a MAC PDU. The MAC PDU may be defined in various MAC frame formats, and a basic MAC frame may include a MAC header, Frame Body, and Frame Check Sequence (FCS).

For example, referring to FIG. 19, the MAC header may include Frame Control, Duration/ID, Addresses, Sequence Control, QoS Control, and HT Control. In the MAC header, the Frame Control field may include control information required for frame transmission/reception. The Duration/ID field may be set to a time required to transmit the frame. The Address fields may include identification information about a transmitter and a receiver, which will be described later. For the Sequence Control, QoS Control, and HT Control fields, refer to the IEEE 802.11 standard specifications.

For example, the HT Control field may be configured in two types, HT variant and VHT variant, and include different information according to the types. Referring to FIGS. 20 and 21, a VHT subfield of the HT Control field may indicate whether the HT Control field is the HT-variant type or the VHT-variant type. For example, if the VHT subfield is set to '0', the HT Control field may be the HT-variant type, and if the VHT subfield is set to '1', the HT Control field may be the VHT-variant type.

For example, referring to FIG. 20, if the HT Control field is the HT-variant type, the HT Control field may include Link Adaptation Control, Calibration Position, Calibration Sequence, CSI/Steering, HT NDP Announcement, AC constraint, RDG/More PPDU, and Reserved fields. For example, referring to (b) of FIG. 20, the Link Adaptation Control field may include TRQ, MAI, MFSI, and MFB/ASELC. For more details, refer to the IEEE 802.11 standard specifications.

For example, referring to FIG. 21, if the HT Control field is the VHT-variant type, the HT Control field may include MRQ, MSI, MFSI/GID-LM, MFB GID-H, Coding Type, FB Tx Type, Unsolicited MFB, AC constraint, RDG/More PPDU, and Reserved fields. For example, referring to (b) of FIG. 21, the MFB field may include VHT N_STS, MCS, BW, and SNR. For more details, refer to [Table 1] and the IEEE 802.11 standard specifications.

TABLE 1

| Subfield | Meaning | Definition |
| --- | --- | --- |
| MRQ | VHT-MCS feedback request | Set to 1 to request VHT-MCS feedback (solicited MFB); otherwise set to 0. |
| MSI/STBC | MRQ sequence identifier/STBC indication | If the Unsolicited MFB subfield is 0 and the MRQ subfield is 1, the MSI/STBC subfield contains a sequence number in the range 0 to 6 that identifiers the specific MCS feedback request.<br>If the Unsolicited MFB subfield is 0 and the MRQ subfield is 0, the MSI/STBC subfield is reserved.<br>If the Unsolicited MFB subfield is 1 and the MFB does not contain the value representing "no feedback is present," the MSI/STBC field contains the Compressed MSI and STBC Indication subfields as shown FIG. 8-8b.<br>The STBC Indication subfield indicates whether the estimate in the MFB subfield is computed based on a PPDU using STBC encoding:<br>Set to 0 if the PPDU was not STBC encoded<br>Set to 1 if the PPDU was STBC encoded<br>The Compressed MSI subfield contains a sequence number that identifies the specific MCS feedback request. It is in the range 0 to 3 if STBC Indication equals 0 or in the range 0 to 2 if STBC Indication equals 1.<br>Otherwise, the MSI/STBC subfield is reserved. |
| MFSI/GID-L | MFB sequence identifier/LSBs of group ID | If the Unsolicited MFB subfield is 0, the MFSI/GID-L subfield contains the received value of MSI contained in the frame to which the MFB information refers.<br>If the Unsolicited MFB subfield is 1, the MFB does not contain the value representing "no feedback is present," and the MFB is estimated from a VHT MU PPDU, then the MFSI/GID-L subfield contains the lowest 3 bits of group ID of that PPDU from which the MFB was estimated (bit 0 of the group ID appears in the lowest numbered bit of the field MFSI/GID-L). If the unsolicited MFB is estimated from an SU PPDU, the MFSL/GID-L subfield is set to all ones.<br>Otherwise, this subfield is reserved. |
| MFB | NUM_STS, VHT-MCS, BW and SNR feedback | MFB subfield is interpreted as defined in Table 8-13b. This subfield contains the recommended MFB. The combination of VHT-MCS = 15 and NUM_STS = 7 indicates that no feedback is present. |
| GID-H | MSBs of Group ID | If the Unsolicited MFB subfield is 1, the MFB does not contain the value representing "no feedback is present," and the unsolicited MFB is estimated from a VHT MU PPDU, then the GID-H subfield contains the highest 3 bits of group ID of the PPDU from which the unsolicited MFB was estimated (bit 3 of the group ID appears in the lowest numbered bit of the field GID-H). If the unsolicited MFB is estimated from an SU PPDU, the GID-H subfield is set to all ones.<br>Otherwise, this subfield is reserved. |
| Coding Type | Coding type of the measured PPDU | If the Unsolicited MFB subfield is 1 and the MFB does not contain the value representing "no feedback is present," the Coding Type subfield contains the Coding information (0 for BCC and 1 for LDPC) of the PPDU from which the unsolicited MFB was estimated.<br>Otherwise, this subfield is reserved. |
| FB Tx Type | Transmission type of the measured PPDU | If the Unsolicited MFB subfield is 1, the MFB does not contain the value representing "no feedback is present," and FB Tx Type subfield is 0, then the unsolicited MFB is estimated from a VHT PPDU with RXVECTOR parameter BEAMFORMED equal to 0.<br>If the Unsolicited MFB subfield is 1, the MFB does not contain the value representing "no feedback is present," and the FB Tx Type subfield is 1, then the unsolicited MFB is estimated from a VHT PPDU with RXVECTOR parameter BEAMFORMED equal to 1.<br>Otherwise, this subfield is reserved. |

FIG. 22 is a view illustrating a Short MAC frame format. A MAC frame may be configured as a Short MAC frame by reducing unnecessary information when needed, to prevent waste of radio resources. For example, referring to FIG. 22, the MAC header of a Short MAC frame may always include a Frame Control field, an A1 field, and an A2 field. The MAC header may selectively include a Sequence Control field, an A3 field, and an A4 field. Since information unnecessary for a MAC frame is not included in a Short MAC frame in this manner, radio resources may be conserved.

For example, the Frame Control field of the MAC header may include Protocol Version, Type, PTID/Subtype, From DS, More Fragment, Power Management, More Data, Protected Frame, End of Service Period, Relayed Frame, and Ack Policy. For a description of each subfield of the Frame Control field, refer to the IEEE 802.11 standard specifications.

Meanwhile, the Type field of the Frame Control field in the MAC header may be defined as illustrated in [Table 2]. The Type field may be 3 bits with value 0 to value 3 providing address information and value 4 to value 7 being reserved. New address information may be provided using the reserved values in the present disclosure, which will be described later.

TABLE 2

| Type | Type description |
|---|---|
| 0 | Data<br>Either A1 or A2 is an SID (defined in 8.8.3.2 (Address fields)), as determined by the From DS field in the Frame Control field |
| 1 | Management<br>Either A1 or A2 is an SID (defined in 8.8.3.2 (Address fields)), as determined by the From DS field in the Frame Control field<br>Both A1 and A2 fields contain MAC addresses for Short Probe Response frames. |
| 2 | Control<br>A1 is an SID and A2 is either an SID or contains a MAC address |
| 3 | Data<br>Both A1 and A2 fields contain MAC addresses |
| 4-6 | Reserved |
| 7 | Extension (currently reserved) |

In the Frame Control field of the MAC header, the From DS field may be 1 bit, as defined in [Table 3]. The present disclosure is applicable to the From DS field, which will be described later.

TABLE 3

| From DS field | Meaning | Use |
|---|---|---|
| 0 | A1 contains the MAC address of the receiver<br>A2 is an SID which contains the AID of the transmitter<br>A2 contains the MAC address of the transmitter for Short Data frames with Type field equal to 3<br>A3 (if present) contains the MAC address of the destination<br>A4 (if present) contains the MAC address of the source | For frames transmitted a by non-AP STA to an AP For frames transmitted from a non-AP STA to non-AP STA (direct link) |
| 1 | A1 is an SID which contains the AID of the receiver<br>A1 contains the MAC address of the receiver for Short Data frames with Type field equal to 3<br>A2 is the MAC address of the transmitter<br>A3 (if present) contains the MAC address of the destination<br>A4 (if present) contains the MAC address of the source | AP to non-AP STA |

Each of the More Fragment, Power Management, More Data, Protected Frame, End of Service Period, Relayed Frame, and Ack Policy fields may be configured in 1 bit. The Ack Policy field may provide ACKnowledgement/Negative ACKnowledgement (ACK/NACK) information in 1 bit, and each value of the Ack Policy field may be defined as listed in [Table 4]. For more details, refer to the IEEE 802.11 standard specifications.

TABLE 4

| Ack Policy field | Meaning |
|---|---|
| 0 | Normal Ack or Implicit Block Ack Request<br>In a Short frame that is a non-A-MPDU frame or VHT single MPDU where neither the originator nor the addressed recipient support Fragment BA procedure:<br>The addressed recipient returns an Ack frame after a short interframe space (SIFS) period, according to the procedures defined in 9.3.2.9 (Ack procedure)<br>In a Short frame that is part of an A-MPDU that is not a VHT single MPDU:<br>The addressed recipient returns a BlockAck frame, either individually or as part of an A-MPDU starting a SIFS after the PPDU carrying the frame, according to the procedures defined in 9.3.2.9 (Block Ack procedure), 9.23.7.5 (Generation and transmission of BlockAck frames by an HT STA, or DMG STA or S1G STA), and 9.22.8.3 (Operation of HT-delayed Block Ack)<br>In a Short frame that is a fragment:<br>When both the originator and the addressed recipient support the Fragment BA procedure, the addressed recipient returns an NDP BlockAck frame after a SIFS, according to the procedure defined in 9.3.2.10a (Fragment BA procedure).<br>Ack Policy 0 is limited to at most one MU recipient per MU PPDU |
| 1 | No Ack or Block Ack Policy<br>In a Short frame that is a non-A-MPDU frame or VHT single MPDU:<br>The addressed recipient takes no action upon receipt of the frame. More details are provided in 9.23 (No Acknowledgement (No Ack)). The Ack Policy subfield is set to the value in all individually addressed frames in which the sender does not require |

TABLE 4-continued

| Ack Policy field | Meaning |
|---|---|
| | acknowledgement. The Ack Policy subfield is also set to this value in all group addressed frames. This combination is not used for Short Data frames with a TID for which a Block Ack agreement exists.<br>In a Short frame that is part of an A-MPDU that is not a VHT single MPDU: The addressed recipient take no action upon receipt of the frame except for recording the state. The recipient can expect a BlockAckReq frame in the future to which it responds using procedure described in 9.23 (Block acknowledgment (block ack)) |

Regarding STAs using a frame constructed in the above-described format, an AP VHT STA may support a non-AP VHT STA operating in a Transmit Opportunity (TXOP) power save mode in a BSS. For example, the non-AP VHT STA may operate in the TXOP power save mode in an awake state. The AP VHT STA may switch the non-AP VHT STA to a doze state during a TXOP. For example, the AP VHT STA may command the non-AP VHT STA to switch to the doze state by transmitting a VHT PPDU with a TXVECTOR parameter, TXOP_PS_NOT_ALLOWED set to 0. Parameters in TXVECTOR transmitted along with the VHT PPDU by the AP VHT STA may be changed from 1 to 0 and maintained during the TXOP. Therefore, power may be saved during the remaining TXOP.

On the contrary, if TXOP_PS_NOT_ALLOWED is set to 1 and thus power saving is not performed, the parameters in TXVECTOR may be kept unchanged.

For example, as described before, the non-AP VHT STA may switch to the doze state in the TXOP power save mode during a TXOP, if the following conditions are satisfied.

- A VHT MU PPDU is received, and the STA is not indicated as a group member by an RXVECTOR parameter, Group_ID.
- An SU PPDU is received, and an RXVECTOR parameter, PARTIAL_AID is not 0 or does not match the partial AID of the STA.
- Although the STA determines that the RXVECTOR parameter, PARTIAL_AID matches the partial AID of the STA, a receiver address of the MAC header does not match the MAC address of the STA.
- Although the RXVECTOR parameter, Group_ID indicates that the STA is a group member, an RXVECTOR parameter, NUM_STS is set to 0.
- A VHT NDP Announcement frame is received, and the RXVECTOR parameter, PARTIAL_AID is set to 0 and does not match the AID of an Info field for the STA.
- The STA receives a frame with More Data set to 0 and Ack Policy set to No Ack, or transmits an ACK with Ack Policy set to a value other than No Ack.

The AP VHT STA may include a Duration/ID value set to the remaining TXOP interval and a NAV-SET Sequence (e.g., Ready To Send/Clear To Send (RTS/CTS)). Herein, the AP VHT STA may not transmit a frame to the non-AP VHT STA switching to the doze state based on the above-described conditions during the remaining TXOP.

For example, if the AP VHT STA transmits a VHT PPDU with the TXVECTOR parameter, TXOP_PS_NOT_ALLOWED set to 0 in the same TXOP and does not want the STA to switch from the awake state to the doze state, the AP VHT STA may not transmit a VHT SU PPDU.

For example, the AP VHT STA may not transmit a frame to a VHT STA that has switched to the doze state before timeout of a NAV set at the start of a TXOP.

If the AP VHT STA fails to receive an ACK after transmitting a frame including at least one of a MAC Service Data Unit (MSDU), an Aggregated-MSDU (A-MSDU), and a MAC Management Protocol Data Unit (MMPDU), with More Data set to 0, the AP VHT STA may retransmit the frame at least once in the same TXOP. For example, if the AP VHT STA fails to receive an ACK for a retransmission in the last frame of the same TXOP, the AP VHT STA may retransmit the frame after waiting until the next TXOP.

For example, the AP VHT STA may receive a Block Ack frame from a VHT STA operating in the TXOP power save mode. The Block Ack frame may be a response to an A-MPDU including an MPDU with More Data set to 0. Herein, the AP VHT STA is in the doze state and may not receive a response to the sub-sequence of a retransmitted MPDU during the same TXOP.

Further, a VHT STA that has operated in the TXOP power save mode and switched to the doze state may activate a NAV timer while it stays in the doze state. For example, upon expiration of the timer, the VHT STA may transition to the awake state.

Further, the STA may contend for medium access, upon expiration of the NAV timer.

Figure 23:
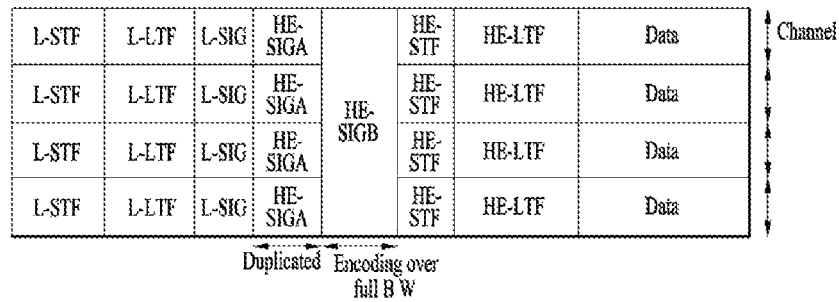
FIG. 23 is a diagram illustrating an example of a PPDU format.

FIG. 23 is a view illustrating exemplary PPDU formats. As described before, various PPDU formats are available. For example, a new PPDU format may be provided. A PPDU may include L-STF, L-LTF, L-SIG, and DATA fields. For example, the PPDU frame may further include HE-SIG A, HE-STF, HE-LTF, and HE-SIG B fields. The HE-SIG A field may include, for example, common information. For example, the common information may include Bandwidth, Guard Interval (GI), Length, BSS Color, and so on. For example, an L part (L-STF, L-LTF, and L-SIG) may be transmitted in a Single Frequency Network (SFN) mode on a 20-MHz basis in the frequency domain. For example, like the L part, the HE-SIG A field may be transmitted in the SFN mode on a 20-MHz basis. For example, if a channel has a bandwidth larger than 20 MHz, the L part and the HE-SIG A field may be duplicated on a 20-MHz basis and then transmitted. The HE SIG-B field may provide user-specific information. For example, the user-specific information may include an STA AID, resource allocation information (e.g., an allocation size), an MCS, $N_{sts}$, coding, STBC, TXBF, and so on. Further, the HE SIG-B field may be transmitted across a total bandwidth.

For example, referring to (b) of FIG. 23, a PPDU may be transmitted in an 80-MHz band. The L part and the HE-SIG A field may be duplicated on a 20-MHz basis and then transmitted, and the HE-SIG B field may be transmitted across the total 80-MHz band. However, the transmission scheme may be purely exemplary, not limited to the above embodiment.

Figure 24:
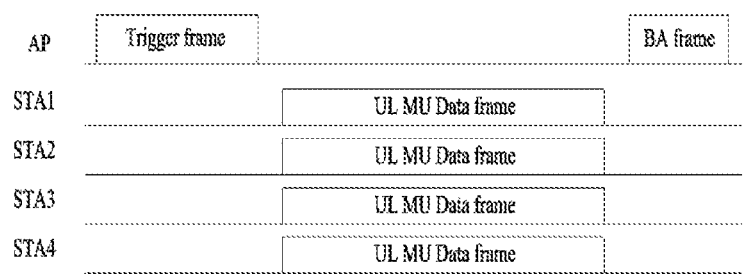
FIG. 24 is a diagram illustrating a method for performing uplink multi-user (UL MU) transmission in an AP STA and a non-AP STA.

FIG. 24 is a diagram illustrating a method for performing uplink multiuser (UL MU) transmission in an AP STA and a non-AP STA.

As described above, the AP may acquire a TXOP to access a medium, transmit a signal by occupying the medium through contention. Referring to FIG. 24, the AP STA may transmit a trigger frame to a plurality of STAs to perform UL MU transmission. In this case, the trigger frame may include, for example, information on a resource allocation location and size, IDs of the STAs, MCS, and MU type (=MIMO, OFDMA) as UL MU allocation information. That is, the trigger frame transmitted by the AP STA to a plurality of STAs may be a frame allowing the plurality of STAs to perform UL data transmission. For example, the plurality of STAs may transmit data to the AP after SIFS elapses based on the format indicated by the trigger frame. The AP may then send ACK/NACK information to the STAs, thereby performing UL MU transmission.

Figure 25:
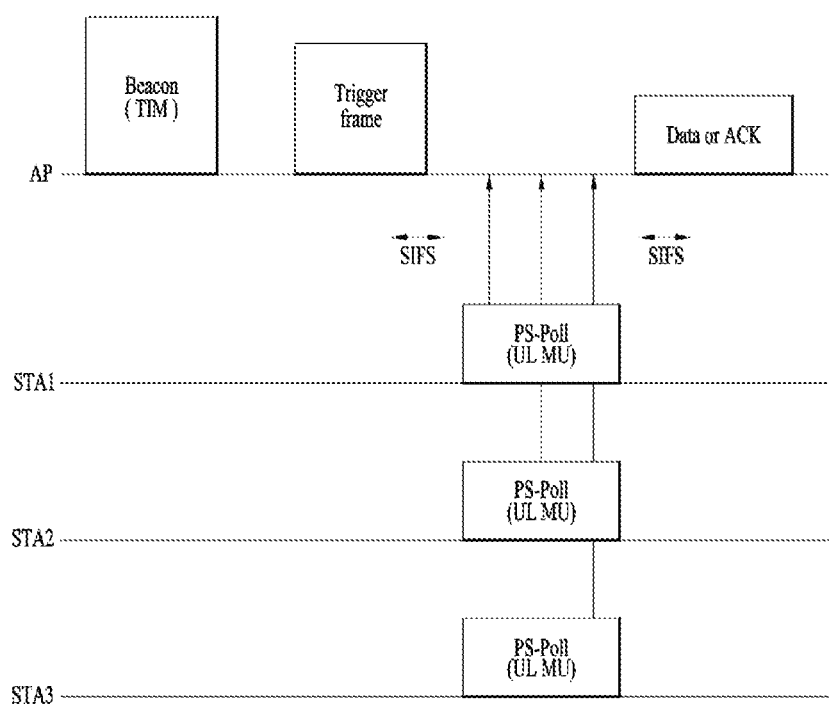
FIG. 25 is a diagram illustrating a method for transmitting a PS-Poll based on UL MU.

FIG. 25 is a diagram illustrating a method of transmitting a PS-Poll based on UL MU. As described above, an STA may switch from the sleep mode to the awake mode to receive a beacon frame including a Traffic Indication Map (TIM) from the AP STA, and analyze the received TIM element. Thereby, the STA may recognize that there is buffered traffic to be transmitted thereto. At this time, the AP STA may transmit resource information for UL MU data transmission to a plurality of STAs through the trigger frame in order to transmit UL MU data. For example, a plurality of STAs may transmit UL MU PS-Poll frames to the AP STA through a region assigned thereto based on UL MU. Upon receiving the PS-Poll frames transmitted by the plurality of STAs, the AP STA may transmit a data frame. If the AP STA fails to prepare the data frame during the SIFS, it may transmit an ACK frame to the plurality of STAs. That is, each of the plurality of STAs may receive the trigger frame from the AP STA and transmit a PS-Poll frame to the AP STA based on UL MU. In this case, for example, the trigger frame transmitted by the AP STA may be a polling frame or a downlink (DL) data frame. That is, the frame transmitted to a plurality of STAs by the AP STA may be a frame for awakening the plurality of STAs from the Power Saving (PS) mode and transmitting data to the plurality of STAs. In this case, for example, the PS-Poll frame transmitted to the AP STA as a frame indicating that the plurality of STAs is in the awake mode may be an NDP frame. Here, the NDP frame may refer to a frame format in which no data packet is included. That is, the NDP frame may refer to a frame format that includes only the PLCP header part (i.e., the STF, LTF, and SIG fields) of a typical PPDU format and does not include the other part (i.e., the data field). At this time, the plurality of STAs does not transmit data through the PS-Poll frame transmitted to the AP STA based on UL MU, and therefore, the data field may not be included. Thereby, waste of radio resources may be prevented and the efficiency of resource use may be enhanced.

FIG. 26 is a diagram illustrating a structure of an NDP frame transmitted by a plurality of STAs. As described above, a plurality of STAs may receive a frame from the AP STA, and then transmit a frame of the NDP type to the AP STA through a region allocated thereto based on UL MU. That is, each of the plurality of STAs may transmit an NDP frame to the AP STA in a region allocated thereto.

In this case, for example, referring to FIG. 26(a), the existing NDP frame may include an STF field, an LTF field, and a SIG field. Here, the SIG field may include an NDP body field, which will be described later. For example, referring to FIG. 26(b), when the plurality of STAs transmits an NDP frame in a resource region allocated thereto based on UL MU, the NDP frame may include an L-STF field, an L-LTF field, an L-SIG field and an HE-SIG field. Here, the L-STF field, the L-LTF field, and the L-SIG field may be a legacy part (hereinafter, L-part). The HE-STF field, the HE-LTF field, and the HE-SIG field may be an HE-part. In this case, for example, the NDP frame may include only the HE-SIG field among the HE-STF field, the HE-LTE field and the HE-SIG field as the HE-part. The Data field may not be included in the NDP frame. That is, the NDP frame may include an L-part and an HE-SIG part (or field). That is, a frame format different from the existing NDP frame may be given in consideration of a situation in which frames are transmitted through resource regions allocated to each of the STAs based on UL MU.

In this case, for example, the HE-SIG part may be 64 FFTs as the L-part (L-STF field, L-LTF field, and L-SIG field). In this case, for example, the L-part of the NDP frame may have a fixed symbol size. In this case, for example, if the size of the resource allocated to each STA for transmission is smaller than or equal to 20 MHz, the L-part may be transmitted in the form of a Single Frequency Network (SFN) over 20 MHz. That is, the L-part may be transmitted through frames simultaneously at a bandwidth of 20 MHz to which the allocated resources belong. In addition, if the size of the resources allocated to each STA for transmission is larger than 20 MHz, the L-part may be duplicated in units of 20 MHz.

In addition, for example, the number of information bits included in the HE-SIG part (or field) of the NDP frame may be constant regardless of the bandwidth. In this case, for example, the HE-SIG part (or field) to be transmitted may have the size allocated through the trigger frame. In this case, for example, the HE-SIG part (or field) may have a symbol size varying depending on the determined bandwidth.

For example, referring to Table 5 below, the information bits included in the HE-SIG part (or field) may be configured with 24 bits (including CRC and tail) or 48 bits (including CRC and tail). In this case, when the BPSK 1/2 coding rate is used, the symbol size of the HE-SIG field having the 24 information bits may correspond to one symbol. The symbol size of the HE-SIG field having the 48 information bits may correspond to 2 symbols. That is, the symbol size of the HE-SIG part (or field) may be changed based on the given number of bits.

In addition, for example, the symbol size of the HE-SIG part (or field) may be changed based on the size of the allocated resources with the number of HE-SIG information bits fixed. In this case, the symbol size of the HE-SIG part (or field) having 24 bits as information bits, for example, may be 1 symbol if the allocated resource is 20 MHz, 2 symbols if the allocated resource is 10 MHz, 4 symbols if the allocated resource 5 MHz, and 8 symbols if the allocated resource is 2.5 MHz. That is, since the number of information bits for the HE-SIG field is fixed regardless of the size of the bandwidth, if the bandwidth which is an allocated resource is reduced, the symbol size may increase.

That is, when a plurality of STAs transmits an NDP frame through the allocated resources based on UL MU, the L-part of the NDP frame is duplicated in units of 20 MHz, and the HE-SIG part (or field) may be configured based on the resource size assigned to each STA. In this case, the symbol size may vary.

TABLE 5

| Allocated resource size | Number of HE-SIG information bits (24 bits) | Number of HE-SIG information bits (48 bits) |
| --- | --- | --- |
| 2.5 MHz | 8 symbols | 16 symbols |
| 5 MHz | 4 symbols | 8 symbols |
| 10 MHz | 2 symbols | 4 symbols |
| 20 MHz | 1 symbol | 2 symbols |
| >20 MHz (e.g., 40, 80, 160 MHz) | When a bandwidth larger than 20 MHz is allocated, HE-SIG is duplicated in units of 20 MHz like the L-part, and the number of symbols is equal to 20 MHz. | |

Figure 27:
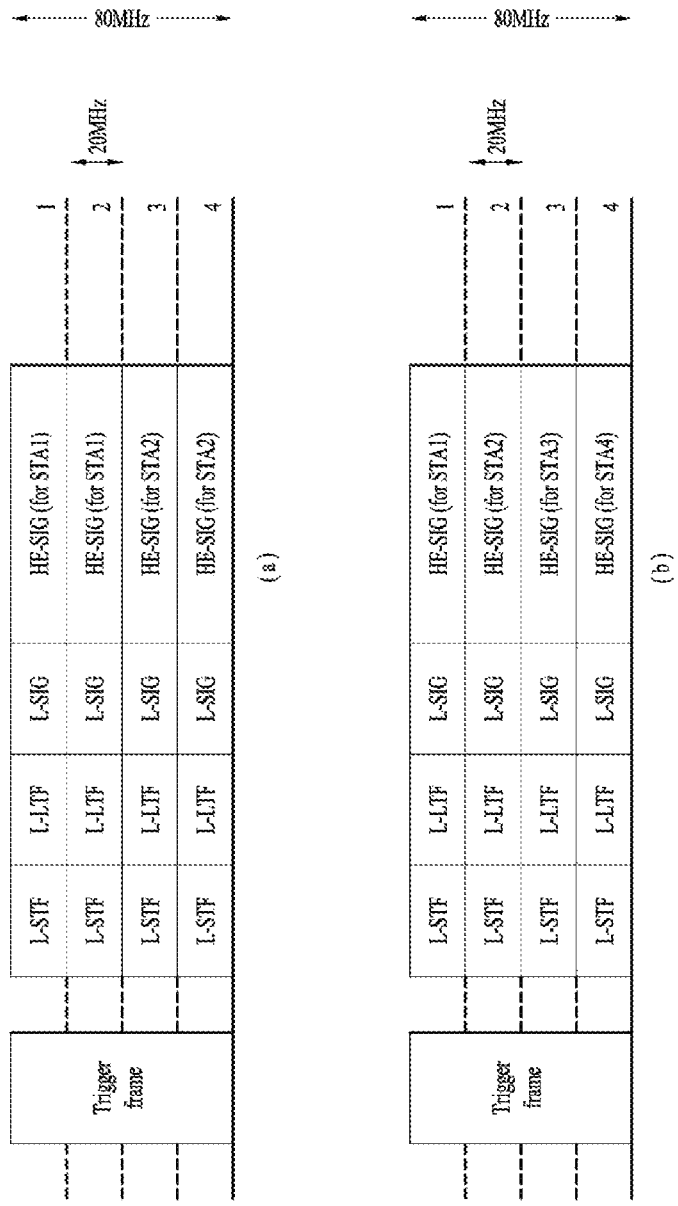
FIGS. 27 and 28 are diagrams illustrating a method for transmitting an NDP frame by a plurality of STAs based on a trigger frame.
Figure 28:
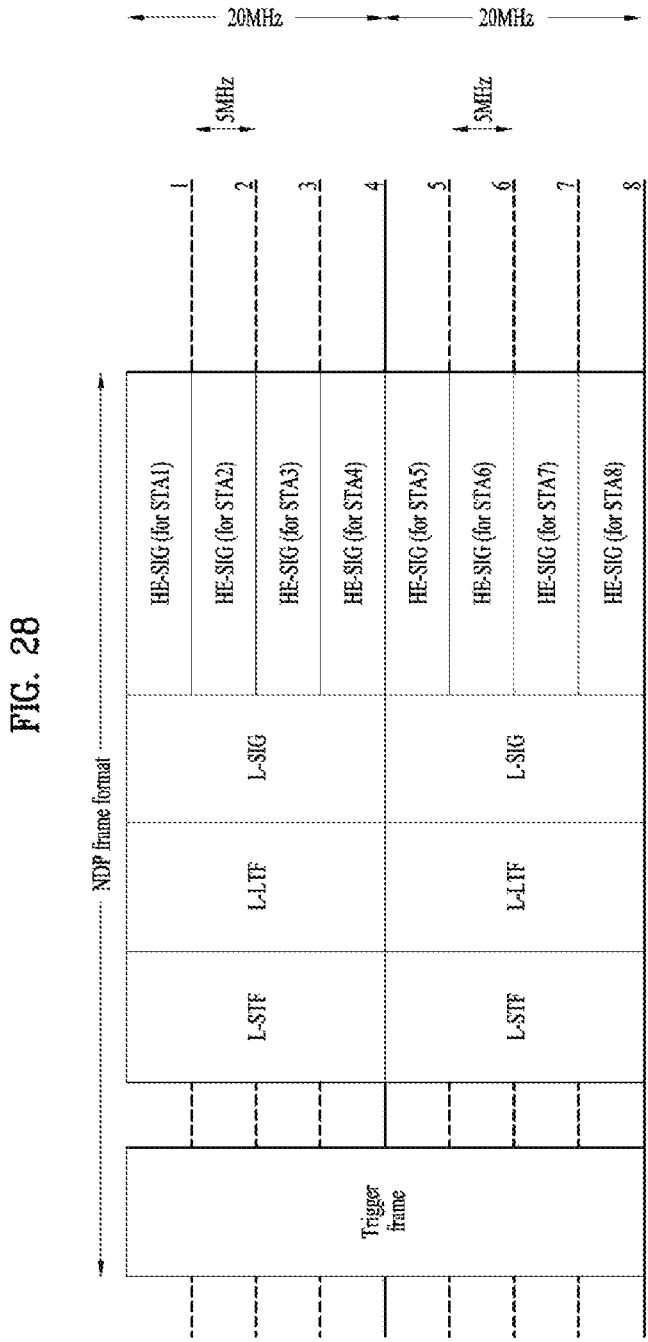

FIGS. 27 and 28 are diagrams illustrating a method for transmitting an NDP frame by a plurality of STAs based on a trigger frame.

As described above, each of the plurality of STAs may receive the trigger frame from the AP STA, and then transmit an NDP frame through the resources allocated thereto.

Referring to FIG. 27(a), the AP STA may transmit, to two STAs, a trigger frame including information for allocating a resource of 40 MHz to each of the STAs. As 40 MHz is larger than 20 MHz, each of the STAs duplicates the L-part and the HE-SIG part (or field) of the NDP frame in units of 20 MHz and transmits the same at 40 MHz. That is, each part may be duplicated in units of 20 MHz and transmitted.

Referring to FIG. 27(b), the AP STA may allocate a resource corresponding to 20 MHz to each of four STAs through a trigger frame in the bandwidth of 80 MHz, thereby causing the STAs to transmit NDP frames. In this case, since each of the plurality of STAs is allocated 20 MHz, each of the STAs may transmit the L-part and the HE-SIG part (or field) in units of 20 MHz. In this case, if the total number of information bits included in the HE-SIG part (or field) is 24, the symbol size of the HE-SIG part (or field) may be fixed to 1 symbol at 20 MHz.

In addition, referring to FIG. 28, the AP STA may allocate a resource of 5 MHz to each of 8 STAs in the bandwidth of 40 MHz. In this case, for example, each of the plurality of STAs transmits an HE-SIG part (or field) in a resource region having the size of 5 MHz since the resource of 5 MHz has been allocated to each of the STAs through the trigger frame. In this case, as described above, when the total number of information bits included in the HE-SIG part (or field) is 24, the symbol size of the HE-SIG part (or field) may be fixed to 4 symbols at 5 MHz. In addition, for example, the L-part may be transmitted in the form of SFN at 20 MHz although the resource of 5 MHz has been allocated thereto. At this time, STAs 1 to 4 may simultaneously transmit the L-parts at 20 MHz of a band to which STAs 1 to 4 belong. In addition, STAs 5 to 8 may simultaneously transmit the L-parts at 20 MHz to which STAs 5 to 8 belong. That is, the HE-SIG part (or field) may be configured and transmitted based on the allocated resource, and the L-part may be configured and transmitted based on a certain size regardless of the allocated resource.

FIGS. 29 and 30 are diagrams illustrating an NDP frame format included in an HE-SIG part (or field). As described above, when a plurality of STAs transmits frames based on allocated resources according to UL MU, the format of the NDP frame may be different.

In this case, referring to FIG. 29, the NDP frame format based on UL MU may be different from the existing NDP frame format regarding the respective fields thereof.

For example, referring to FIG. 29(a), at least one of an NDP CMAC frame body field, an NDP indication field, a CRC field, and a Tail field may be included in the SIG field of the existing NDP frame. Here, the NDP CMAC frame body field may include, for example, at least one of an NDP CMAC Frame Type field, a CTS/CF-END indicator, an Address indicator, an RA/Partial BSSID field, a Duration field and an Early Sector Indicator field.

Referring to FIG. 29(b), on the other hand, the HE-SIG part (or field) of the NDP frame format based on UL MU includes at least one of an NDP body field, an MU NDP indication field, a CRC field, and a Tail field. The NDP body field may include at least one of an MU NDP frame type field and an NDP contents field. That is, the NDP frame transmitted based on UL MU may be different from the existing frame format because it includes fields containing information necessary for UL MU transmission.

In this case, for example, the MU NDP frame type field of the NDP body field may indicate the type of the UL MU NDP frame. For example, the MU NDP frame type field may be configured with 3 bits. For example, the MU NDP frame type field may indicate that the type of the MU NDP frame is one of an MU NDP PS-Poll frame, an MU NDP sounding frame, MU NDP ACK, MU NDP BA (Block Ack), a Buffer Status Report, and a Channel Status Report MU NDP PS-Poll.

In this case, for example, the MU NDP frame type field may indicate a type through each value shown in Table 6. Table 6 is merely one example, and the present invention is not limited thereto.

TABLE 6

| MU NDP frame type | Type information |
| --- | --- |
| 000 | MU NDP PS-Poll frame |
| 001 | MU NDP sounding frame |
| 010 | MU NDP ACK |
| 011 | MU NDP BA |
| 100 | Buffer Status Report |
| 101 | Channel Status Report |

In addition, information included in the NDP contents field may be configured differently based on the MU NDP frame type field. For example, in the case of the NDP PS Poll frame type, the NDP contents field may include information on an RA (Receiver Address, e.g., Partial BSSID), an SA (Sender Address, e.g., Partial AID), UL data indication, and Preferred MCS. Here, the UL data indication may include information on presence/absence and the size of a UL frame. In the case of the UL MU NDP frame, the UL RA and the SA may be omitted from the NDP frame, and the present invention is not limited to the above-described embodiment.

For example, in the case of the NDP ACK type, the NDP contents field may include information on an ACK ID, a More Data field, a Duration, etc.

For example, in the case of the NDP Block ACK, the NDP contents field may include information on a Block ACK ID (e.g., Identifier of Block ACK), Starting Sequence Control, Block Bitmap (8 or 16 bits), and the like. In this case, the Starting Sequence Control may be a sequence number for the first MSDU or A-MSDU through which the NDP Block ACK frame is transmitted.

For example, in the case of the Buffer Status Report type, the NDP contents field may include information on the Queue Size, Access Category (or TID), Backoff Count, and Modulation and Coding Scheme (MCS). Here, the Queue Size is information indicating the amount of buffered traffic, and on the STA may configure the TXOP duration based on the Queue Size information. In addition, the Access Category may include information on enhanced distributed channel access (EDCA) parameters that a quality-of-service (QoS) STA uses to determine a channel for transmitting an MSDU based on a specific priority. In addition, the Backoff Count may be information about reducing the current backoff count value set at random in [0, CW (AC)] based on a backoff procedure For example, in the case of the Channel Status Report type, the NDP contents field may include information on the MCS, number of space-time streams (Nsts), and SNR (Signal to Noise Ratio). That is, the NDP frame transmitted by the STA may be a frame configured based on UL MU, and the frame format and type thereof may be configured differently.

Referring to FIG. 30(a), if NDP frame type information is included in the trigger frame, the UL MU NDP frame may not include the type field but may include only the NDP contents field. The MU NDP indication field may be, for example, a field indicating that the corresponding PPDU is an MU NDP frame. Referring to FIG. 30(b), the MU NDP indication field may be omitted if information is included in another frame.

Figure 32:
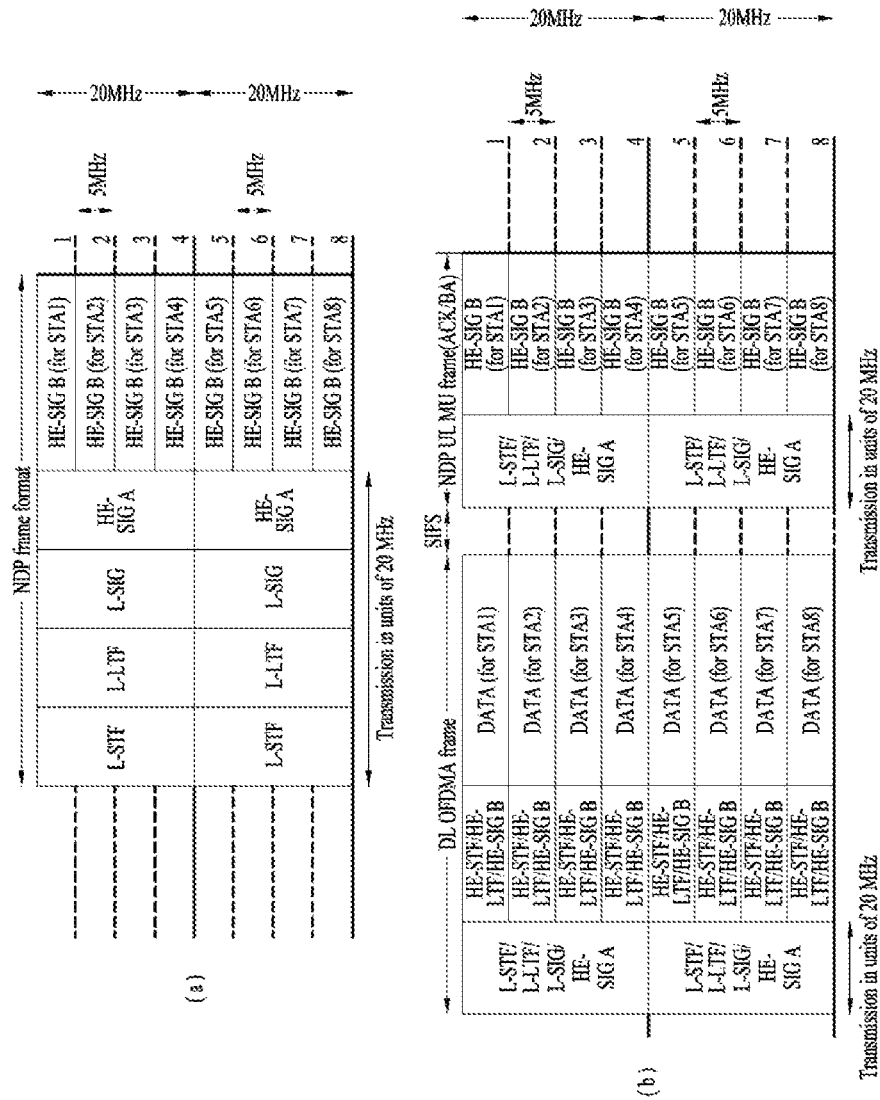

FIGS. 31 and 32 illustrate an HE-SIG part (field) consisting of a fixed size part and a variable size part. Based on UL MU, a plurality of STAs may transmit NDP frames through each allocated resource. As described above, the NDP frame may include an L-part and an HE-SIG part (or field). In this case, for example, the HE-SIG part (or field) may consist of a fixed size part and a variable size part. The fixed size part may be, for example, an HE-SIG A field. The variable size part may be an HE-SIG B field.

In this case, for example, if the size of the allocated resource is smaller than or equal to 20 MHz, the L-part and the fixed size part may be transmitted in the SFN form over 20 MHz. If the size of the allocated resource is larger than 20 MHz, for example, the L-part and the fixed size part may be duplicated in units of 20 MHz. In addition, for example, the variable size part to be transmitted may have the size allocated in the previous DL frame (e.g., the trigger frame) or a fixed size (e.g., 2.5 MHz/5 MHz/10 MHz/ . . . ) in the system.

In addition, for example, the fixed size part may include information common to a plurality of STAs, and the variable size part may include information that is specifically applied to each of the plurality of STAs. More specifically, as described above, even if the size of the allocated resource is smaller than or equal to 20 MHz, the fixed size part may be transmitted in the SFN form in units of 20 MHz in the same manner as the L-part. Therefore, when the size of the allocated resource is less than or equal to 20 MHz, the same information may be transmitted to a plurality of STAs, and accordingly only the common information may be included. Here, the common information may be, for example, information on a bandwidth, a GI (Guard Interval) length, a BSS color field, a length of the HE-SIG B, and the like. In addition, for example, when the allocated resource size of the variable size part is smaller than or equal to 20 MHz, the variable size part may be transmitted based on the resource size allocated to each STA. That is, the variable size part may be transmitted separately for each STA, and may include specific information about the corresponding STA. That is, the HE-SIG part (or field) may consist of a fixed size part (or field) including common information and a variable size part (or field) including STA specific information.

For example, the variable size part may be transmitted in the form of a 1× symbol (e.g., 64 FFT in 20 MHz) or a 4× symbol (e.g., 256 FFT in 20 MHz). At this time, the number of allocated resources may be different depending on whether the form is a 1× symbol or a 4× symbol. For example, in the case of the 4× symbol, when 2.5 MHz is allocated, HE-SIG B may be transmitted over a resource region consisting of 26 tones. For example, in the case of the 4× symbol, when 5 MHz is allocated, HE-SIG B may be transmitted over a resource region consisting of 52 or 56 tones.

In addition, for example, the number of information bits allocated to the variable size part may be fixed. In this case, the symbol size allocated to the variable size part may be set to the same as those of Table 5 above. In addition, for example, the variable size part may be an HE-SIG B field and has the same frame format as that of FIG. 29(b).

More specifically, referring to FIG. 32(a), eight STAs may be allocated a resource with a size of 5 MHz, respectively, and transmit an NDP frame. In this case, for example, each STA may transmit an NDP frame through the resource allocated thereto. For example, the L-part and the HE-SIG A field, which is a fixed size part, may be transmitted in the SFN form in units of 20 MHz. That is, STA1 to STA4 transmit the same L-part and HE-SIG A field, and STA5 to STA8 may transmit the same L-part and HE-SIG A field. In this case, for example, each STA may transmit the HE-SIG B field as a variable size part including information on each STA through the resource allocated thereto.

As another example, although the NDP frame format of the present invention has been specifically described based on UL MU, the present invention is not limited to the UL MU frame. More specifically, when a trigger frame is used to transmit a DL MU frame, the NDP frame may be transmitted in the form of a DL frame. As another example, the NDP frame may be used as a frame transmitted without trigger or polling basis, and the present invention is not limited to the above-described embodiment.

For example, referring to FIG. 32(b), the NDP frame type may be ACK or Block ACK based on the NDP frame type field. More specifically, a plurality of STAs may perform DL MU transmission through the resources allocated thereto. At this time, the plurality of STAs may use a frame of the format described above as a response frame to DL MU transmission. That is, the plurality of STAs may duplicate an L-part and a fixed size part (HE-SIG A field) in an ACK or a Block ACK frame for DL MU in units of 20 MHz, and configure and transmit a variable size part (HE-SIG B field) based on the resources allocated thereto. That is, the NDP frame format as described above may not be limited to transmission based on UL MU.

Figure 33:
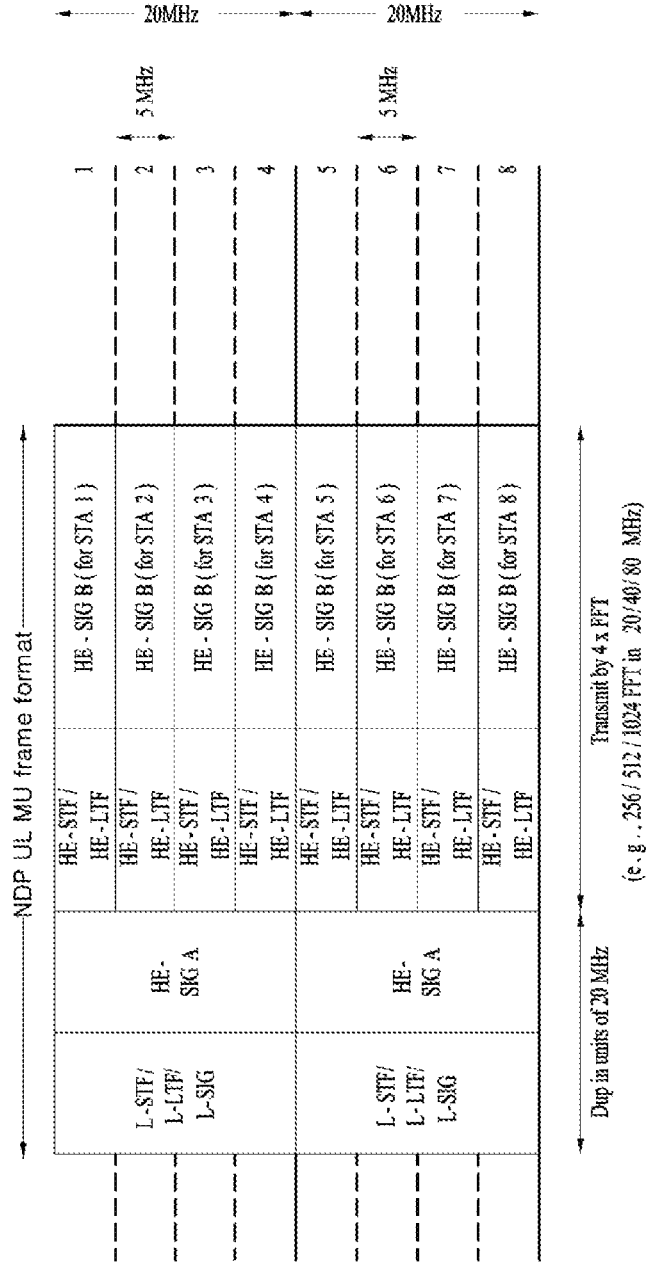
FIGS. 33, 34 and 35 illustrate frames selectively including HE-STF and HE-LTF.
Figure 34:
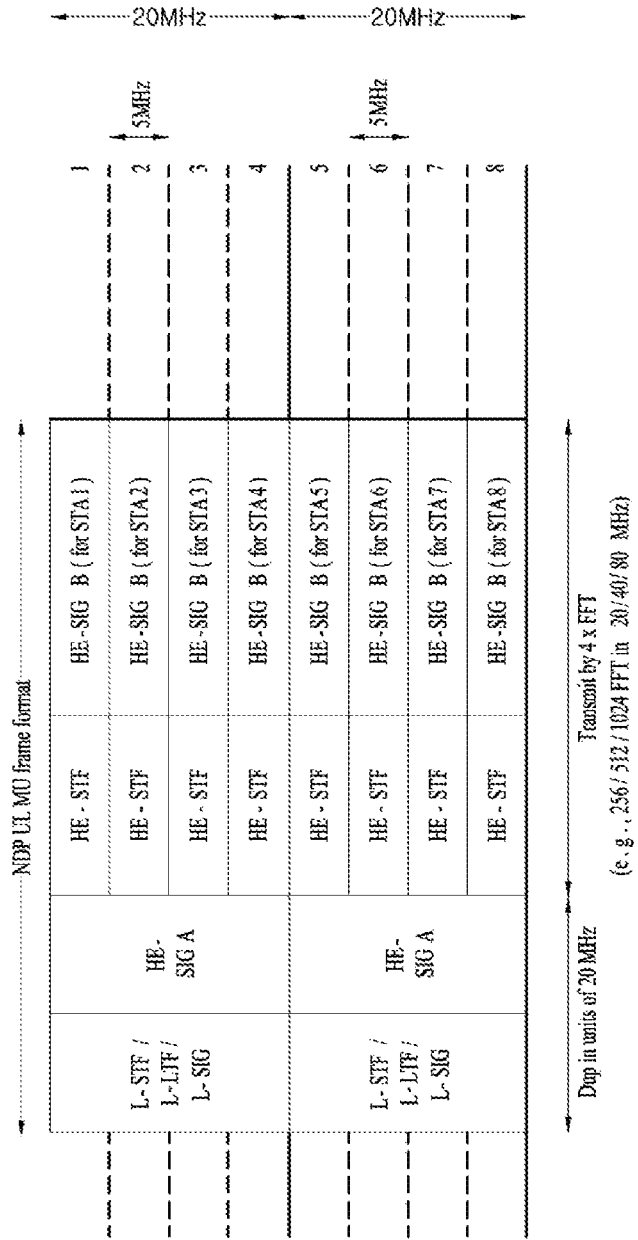
Figure 35:
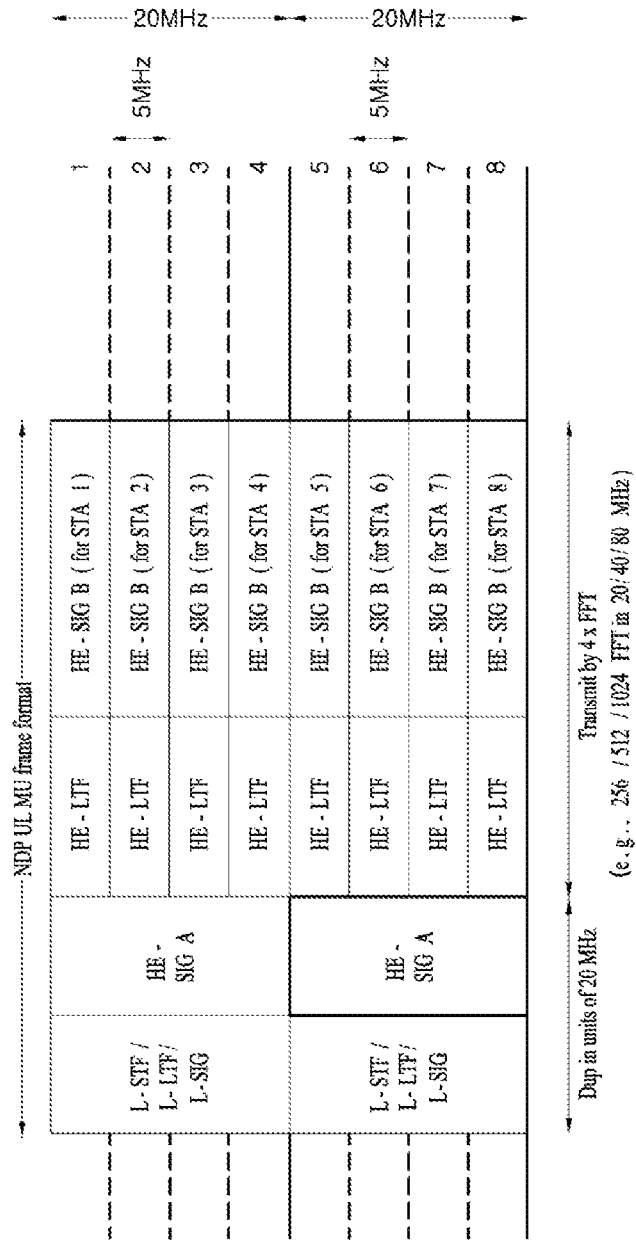

FIGS. 33, 34 and 35 illustrate frames selectively including HE-STF and HE-LTF. As described above, a plurality of stations may transmit NDP frames based on UL MU. As described above, the NDP frame may be divided into an L-part and an HE-SIG part. The HE-SIG part may be divided into an HE-SIG A field as a fixed size part and an HE-SIG B field as a variable size part, as described above. In this case, for example, the NDP frame may further include at least one of the HE-STF and HE-LTF fields. In this case, the HE-STF may include, for example, signals for signal detection, automatic gain control (AGC), diversity selection, and precise time synchronization. The HE-LTF may include, for example, signals for channel estimation and frequency error estimation. In this case, for example, the HE-STF and the HE-LTF may be fields containing information on a specific STA. That is, the information on the HE-STF and the HE-LTF may be information applied to a specific STA. Accordingly, the HE-STF and HE-LTF may also be configured based on the resources allocated thereto as in the case of HE-SIG B.

In this case, referring to FIG. 33, the HE-STF and the HE-LTF may be transmitted after HE-SIG A is transmitted. Then, HE-SIG B may be transmitted. In this case, for example, the HE-STF, HE-LTF and HE-SIG B may be transmitted through resources allocated in the previous DL frame (e.g., a trigger frame, polling frame or DL data frame) or transmitted through a size and location predetermined (e.g., based on order of STAs to which the DL frame is allocated) in the system. In addition, referring to FIGS. 34 and 35, after HE-STF is transmitted following HE-SIG A, HE-SIG B may be transmitted. At this time, HE-STF and HE-SIG B may be transmitted through the resources allocated in the previous DL frame (e.g., trigger frame, polling frame or DL data frame) or transmitted through a size and location predetermined (e.g., based on order of STAs to which the DL frame is allocated) in the system. For example, after HE-STF is transmitted following HE-SIG A, HE-SIG B may be transmitted. At this time, HE-STF and HE-SIG B may be transmitted through the resources allocated in the previous DL frame (e.g., trigger frame, polling frame or DL data frame) or transmitted through a size and location predetermined (e.g., based on order of STAs to which the DL frame is allocated) in the system. That is, HE-STF and HE-LTF may be selectively included and transmitted based on the same resource allocation size as HE-SIG B.

Figure 36:
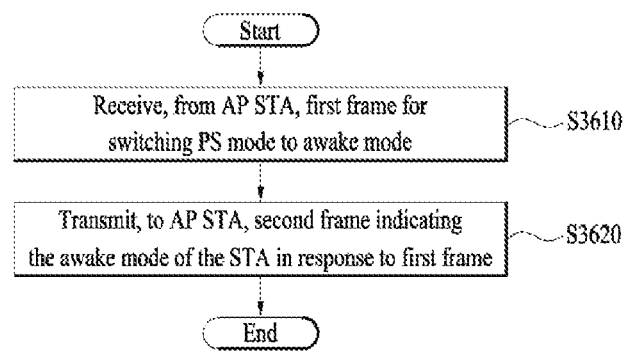
FIG. 36 is a flowchart illustrating a method for transmitting a signal by an STA.

FIG. 36 is a flowchart illustrating a method for transmitting a signal by an STA. The STA may receive a first frame for switching from the power saving (PS) mode to the awake mode from the AP STA (S3610). Here, as described above with reference to FIGS. 25 to 35, the first frame may be one of a trigger frame, a polling frame, and a DL data frame. For example, STA1 may transmit the first frame to a plurality of STAs based on UL MU transmission. At this time, the first frame may include resource allocation information about each of the plurality of STAs. Here, the resource allocation information may be information about resource allocation location and size.

Next, the STA may transmit a second frame indicating the awake mode of the STA to the AP STA in response to the first frame (S3620). As described above with reference to FIGS. 25 to 35, the second frame may be, for example, an NDP (null data packet) frame. The plurality of STAs may each transmit an NDP frame to the AP STA. In this case, for example, the plurality of STAs may transmit NDP frames to STA1 based on the resource allocation information indicated through the first frame. The NDP frame may be, for example, a frame that does not contain data. In addition, the NDP frame may include L-STF, L-LTF, and L-SIG as a legacy part (L-part). In addition, the NDP frame may include a HE-SIG part (or field). Here, for example, the L-part may have a fixed symbol size. The HE-SIG part (or field) may have a fixed number of information bits. In this case, the symbol size of the HE-SIG part (or field) may be set differently based on the number of information bits and the allocated resources for the HE-SIG part (or field), as described above.

Although the NDP frame proposed by the present invention has been described as being a UL NDP frame transmitted by STAs to an AP STA, the present invention is not limited thereto. For example, the NDP frame may be similarly defined and used on downlink. The AP STA may transmit NDP frames to a plurality of STAs on downlink simultaneously. In this case, for example, the NDP frame transmitted on downlink may be used in one of the NDP frame formats as described above, and the present invention is not limited to the above-described embodiment.

Figure 37:
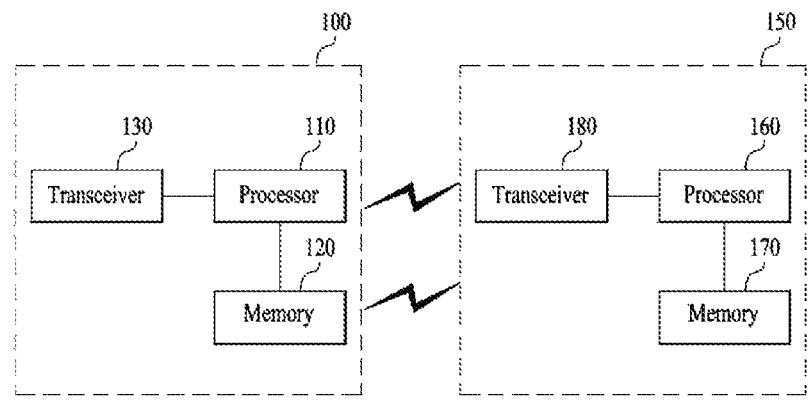
FIG. 37 is a block diagram illustrating an exemplary configuration of an AP (or a BS) and an STA (or a terminal).

FIG. 37 is a block diagram illustrating an exemplary configuration of an AP (or a BS) and an STA (or a terminal) according to an embodiment of the present invention.

The AP 100 may include a processor 110, a memory 120, and a transceiver 130. The STA 150 may include a processor 160, a memory 170, and a transceiver 180.

The transceivers 130 and 180 may transmit/receive radio signals and may implement a physical layer according to, for example, an IEEE 802 system. The processors 110 and 160 may be connected to the transceivers 130 and 180 to implement a physical layer and/or a MAC layer according to the IEEE 802 system. The processors 110 and 160 may be configured to perform operations in accordance with one or more combinations of the various embodiments of the invention described above. In addition, modules implementing the operations of the AP and the STA according to the various embodiments of the present invention described above may be stored in the memories 120 and 170 and executed by the processors 110 and 160. The memories 120 and 170 may be included in the processors 110 and 160 or may be installed outside the processors 110 and 160 and connected to the processors 110 and 160 by known means.

The above description of the AP 100 and the STA 150 may be applied to a BS and a terminal in other wireless communication systems (e.g., LTE/LTE-A system), respectively.

The specific configuration of the AP and the STA may be implemented such that the above-described embodiments of the present invention are applied independently or two or more of the embodiments are applied at the same time. For the sake of clarity, redundant description will be omitted.

Figure 38:
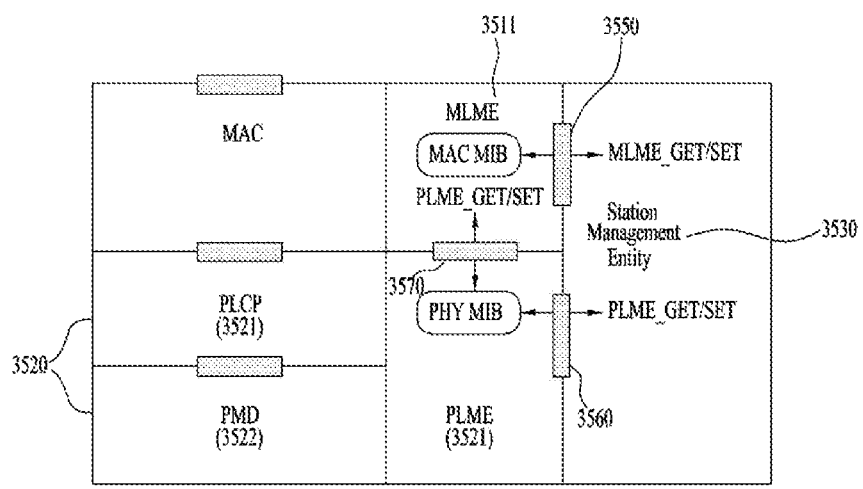
FIG. 38 illustrates an exemplary structure of a processor of an AP or an STA.

FIG. 38 illustrates an exemplary structure of a processor of an AP or an STA according to an embodiment of the present invention.

The processor of the AP or STA may have a plurality of layers, and FIG. 38 specifically illustrates a MAC sublayer 3810 and a physical layer 3820 on a data link layer (DLL) among these layers. As shown in FIG. 38, the PHY 3820 may include a Physical Layer Convergence Procedure (PLCP) entity 3821 and a Physical Medium Dependent (PMD) entity 3822. The MAC sublayer 3810 and the PHY 3820 both conceptually include a management entity called an MLME (MAC Sublayer Management Entity) 3811. These entities 3811 and 3821 provide a layer management service interface in which the layer management function operates.

In order to provide correct MAC operation, an STA Management Entity (SME) 3830 exists in each STA. The SME 3830 is a layer-independent entity that may be present in a separate management plane or may appear to be off to the side. Although the exact functions of the SME 3830 are not specifically described in this document, the entity 3830 may generally appear to serve to collect layer-dependent states from various Layer Management Entities (LMEs) and set layer-specific parameter values similarly. The SME 3830 may typically perform these functions on behalf of the typical system management entity and implement a standard management protocol.

The entities shown in FIG. 38 interact in various ways. FIG. 38 shows some examples of exchanging GET/SET primitives. The XX-GET.request primitive is used to request the value of a given MIB attribute (management information based attribute). The XX-GET.confirm primitive returns an appropriate value of the MIB attribute information if the Status is "Success". Otherwise, it is used to return an error indication in the Status field. The XX-SET.request primitive is used to request that the indicated MIB attribute be set to a given value. If the MIB attribute indicates a specific operation, it is requested that the corresponding operation be performed. The XX-SET.confirm primitive confirms that the indicated MIB attribute is set to a requested value if the status is "Success". Otherwise, it is used to return an error condition to the status field. If the MIB attribute indicates a specific operation, this confirms that the operation has been performed.

As shown in FIG. 38, the MLME 3811 and SME 3830 may exchange various MLME_GET/SET primitives through MLME_SAP 3850. In addition, various PLC-M_GET/SET primitives may be exchanged between the PLME 3821 and the SME 3830 via the PLME_SAP 3860 and may be exchanged between the MLME 3811 and the PLME 3870 via the MLME-PLME_SAP 3870.

The embodiments of the present invention described above may be implemented through various means. For example, the embodiments of the present invention may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. Thus, the present invention is not intended to be limited to the embodiments described herein, but is intended to have the widest scope consistent with the principles and novel features disclosed herein. While the present invention has been particularly shown and described with reference to preferred embodiments thereof, it will be apparent to those skilled in the art that various modifications and variations can be made in the present invention without departing from the spirit or scope of the invention. Such modifications are not to be construed individually from the spirit and scope of the present disclosure.

In this specification, both an article invention and a method invention are explained, and the description of the two inventions may be supplemented as necessary.

INDUSTRIAL APPLICABILITY

Although the present invention has been described on the assumption that the present invention is applied to an IEEE 802.11 based WLAN system, the present invention is not limited thereto. The present invention may be applied to various wireless systems in the same way.

What is claimed is:

1. A method of transmitting a signal by a station (STA) operating in a wireless LAN system, the method comprising: receiving, from an access point (AP), a first frame for switching a power saving (PS) mode to an awake mode; and
transmitting, to the AP, a second frame indicating the awake mode of the STA in response to the first frame,
wherein the second frame is a Null Data Packet (NDP) frame including a legacy field and a high efficiency-signal (HE-SIG) field, and
wherein the legacy field has a fixed symbol size regardless of a size of a resource allocated to the STA and the HE-SIG field comprises a fixed size field having a fixed symbol size regardless of the size of the resource allocated to the STA and a variable size field having a variable symbol size based on the size of the resource allocated to the STA.

2. The method according to claim 1, wherein the first frame is one of a trigger frame, a polling frame, or a downlink (DL) data frame.

3. The method according to claim 1, wherein a number of information bits included in the HE-SIG field is fixed regardless of a bandwidth, and the variable symbol size is determined based on the number of information bits.

4. The method according to claim 1, wherein the HE-SIG field comprises at least one of an NDP body field, a multi user (MU) NDP indication field, a cyclic redundancy check (CRC) field, or a Tail field.

5. The method according to claim 4, wherein the NDP body field comprises at least one of a type field or a content field,
wherein information contained in the content field is configured based on the type field.

6. The method according to claim 5, wherein the type field is not included in the NDP body field when the type field is received in the first frame.

7. The method according to claim 1, wherein the fixed size field comprises common information, and the variable size field comprises information on a specific STA.

8. The method according to claim 7, wherein the fixed size field is an HE-SIG A field and the variable size field is an HE-SIG B field.

9. The method according to claim 8, wherein the variable size field further comprises at least one of a HE-short training field (STF) field and a HE-long training field (LTF) field when the HE-SIG field comprises the fixed size field and the variable size field.

10. A station (STA) for transmitting a signal in a wireless communication system, the STA comprising:
a transceiver module configured to exchange data with an external device: and
a processor configured to control the transceiver module, wherein the processor is configured to:
control the transceiver module to receive, from an access point (AP), a first frame for switching a power saving (PS) mode to an awake mode; and
control the transceiver module to transmit, to the AP, a second frame indicating the awake mode of the STA in response to the first frame,
wherein the second frame is a Null Data Packet (NDP) frame including a legacy field and a high efficiency-signal (HE-SIG) field, and
wherein the legacy field has a fixed symbol size regardless of a size of a resource allocated to the STA and the HE-SIG field comprises a fixed size field having a fixed symbol size regardless of the size of the resource allocated to the STA and a variable size field having a variable symbol size based on the size of the resource allocated to the STA.

11. The STA according to claim 10, wherein the first frame is one of a trigger frame, a polling frame, or a downlink (DL) data frame.

* * * * *